US011912020B2

(12) United States Patent
Miyagawa

(10) Patent No.: US 11,912,020 B2
(45) Date of Patent: Feb. 27, 2024

(54) SHEET SUCTION DEVICE, SHEET CONVEYOR, PRINTER, AND SUCTION AREA SWITCHING DEVICE

(71) Applicant: Ricoh Company, Ltd., Tokyo (JP)

(72) Inventor: Hiroaki Miyagawa, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 502 days.

(21) Appl. No.: 17/137,544

(22) Filed: Dec. 30, 2020

(65) Prior Publication Data

US 2021/0237491 A1 Aug. 5, 2021

(30) Foreign Application Priority Data

Jan. 31, 2020 (JP) ................................ 2020-014527

(51) Int. Cl.
*B65H 5/22* (2006.01)
*B41J 13/22* (2006.01)

(52) U.S. Cl.
CPC ............ *B41J 13/226* (2013.01); *B65H 5/226* (2013.01); *B65H 2406/332* (2013.01); *B65H 2801/06* (2013.01)

(58) Field of Classification Search
CPC .......... B65H 5/226; B65H 5/22; B65H 5/222; B65H 5/224; B65H 2406/332; B65H 2406/3612; B65H 2406/362; B65H 2406/361; B65H 2406/3622; B41J 13/226; B41J 11/0025
See application file for complete search history.

(56) References Cited

U.S. PATENT DOCUMENTS 9,315,331 B2 * 4/2016 Gieser .................. B41F 21/102
9,796,546 B1 * 10/2017 LeFevre ................ B65H 5/224
2020/0039772 A1 2/2020 Miyagawa

FOREIGN PATENT DOCUMENTS

JP 2013-240997 12/2013
JP 2013-241272 12/2013
JP 2020-019637 2/2020

* cited by examiner

*Primary Examiner* — Luis A Gonzalez
(74) *Attorney, Agent, or Firm* — XSENSUS LLP

(57) ABSTRACT

A sheet suction device includes a sheet bearer having a plurality of suction holes, a suction unit, a first member, and a second member. The first member has grooves arranged in a radial direction, and each of the grooves extends in a circumferential direction. The second member has a plurality of hole rows including a plurality of holes. The plurality of holes in each of the plurality of hole rows is arranged in the circumferential direction, and the plurality of hole rows is arranged in the radial direction. When the first member rotates with respect to the second member, the number of holes communicating with the grooves is changed to change the number of the plurality of suction holes communicating with the suction unit. The plurality of holes includes two or more holes that simultaneously communicate with the suction unit when the first member rotates by a unit rotation amount.

15 Claims, 20 Drawing Sheets

SHEET SUCTION DEVICE, SHEET CONVEYOR, PRINTER, AND SUCTION AREA SWITCHING DEVICE

CROSS-REFERENCE TO RELATED APPLICATION

This patent application is based on and claims priority pursuant to 35 U.S.C. § 119(a) to Japanese Patent Application No. 2020-014527, filed on Jan. 31, 2020, in the Japan Patent Office, the entire disclosure of which is hereby incorporated by reference herein.

BACKGROUND

Technical Field

Embodiments of the present disclosure relate to a sheet suction device, a sheet conveyor, a printer, and a suction area switching device.

Description of the Related Art

There is known a printer that prints on a sheet while a sheet conveyor conveys the sheet borne on a rotating member such as a drum. The sheet conveyor sucks and attracts the sheet onto the circumferential surface of the drum and conveys the sheet borne on the drum.

SUMMARY

Embodiments of the present disclosure describe an improved sheet suction device that includes a sheet bearer having a plurality of suction holes on a bearing area, a suction unit to suck the sheet through the plurality of suction holes, a first member between the plurality of suction holes and the suction unit, and a second member between the plurality of suction holes and the suction unit. The sheet bearer bears a sheet on the bearing area of the circumferential surface of the sheet bearer and rotates. The first member has grooves arranged in a radial direction of the first member, and each of the grooves extends in a circumferential direction of the first member. The second member has a plurality of hole rows including a plurality of holes. The plurality of holes in each of the plurality of hole rows is arranged in the circumferential direction, and the plurality of hole rows is arranged in the radial direction. When the first member rotates with respect to the second member, the number of holes communicating with the grooves among the plurality of holes is changed to change the number of the plurality of suction holes communicating with the suction unit. The plurality of holes includes two or more holes that simultaneously communicate with the suction unit when the first member rotates by a unit rotation amount.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
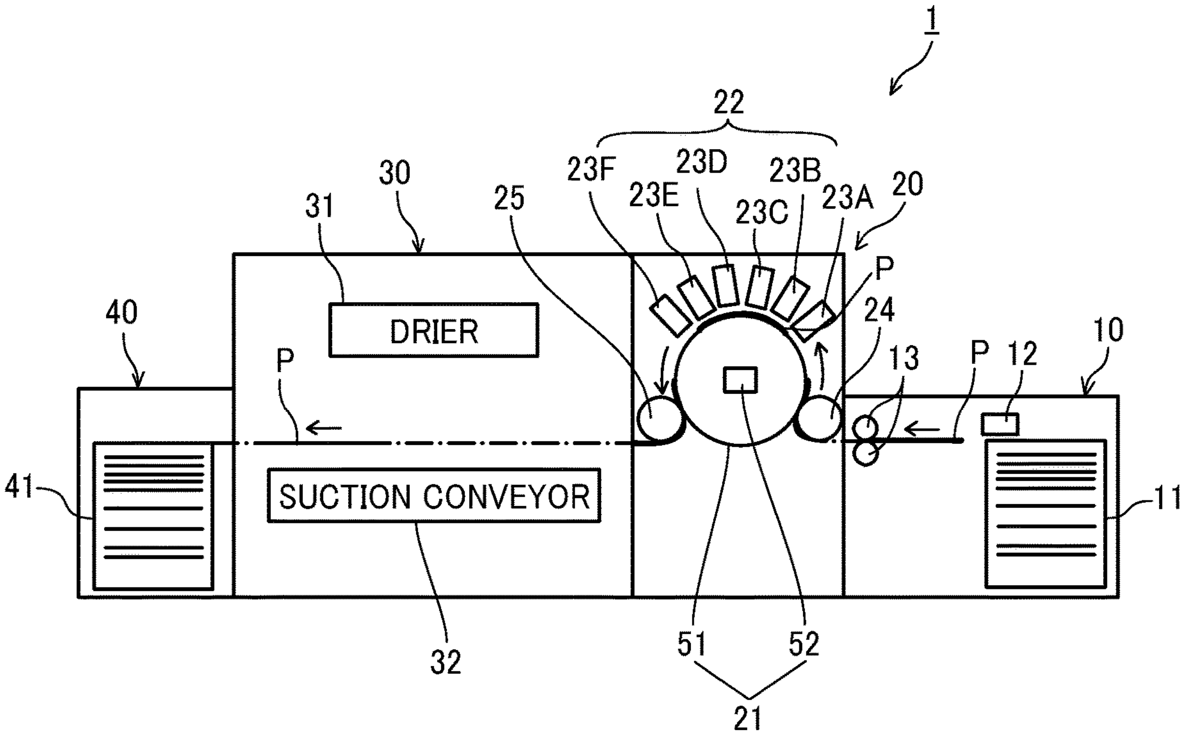
FIG. 1 is a schematic view of a printer according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that suffixes, such as A, B, C, a1, a2, a3, and the like attached to each reference numeral indicate the positions of elements, such as holes, grooves, and suction ports, indicated thereby. These elements may have different shape, size, and the like, but the suffixes may be omitted unless particularly distinguished or when the elements are collectively referred to.

A comparative sheet conveyor includes a drum to suck and convey a sheet. A plurality of suction holes is provided on the entire circumferential surface of a support surface of the drum to support the sheet. The sheet conveyor further includes three suction areas to suck the entire surface of the sheet, a plurality of suction portions that divides each suction area into a plurality of areas, a switching unit between the plurality of suction portions and a negative pressure source, and a controller. The switching unit switches the connection of the negative pressure source to each suction portion. The controller individually controls suction of each of the plurality of suction portions via the switching unit.

However, with such a configuration described above, the switching unit (switching valve) is required to open and close for each suction portion to switch the connection. Therefore, the configuration for switching the connection is likely to become complicated and increase in size.

In view of the foregoing, an object of the present disclosure is to change the suction area with simple configuration.

Figure 2:
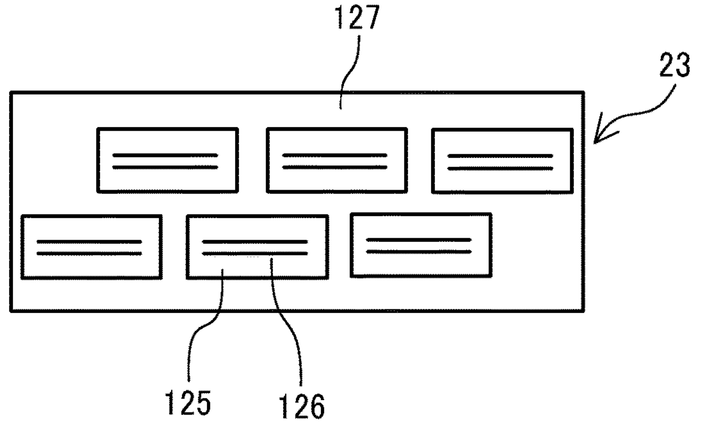
FIG. 2 is a plan view of a discharge unit of the printer illustrated in FIG. 1.

Embodiments of the present disclosure are described below with reference to the accompanying drawings. A first embodiment of the present disclosure is described with reference to FIGS. 1 and 2. FIG. 1 is a schematic view of a printer 1 according to the first embodiment. FIG. 2 is a plan view illustrating an example of a discharge unit 23 (one of discharge units 23A to 23F) of the printer 1 illustrated in FIG. 1.

The printer 1 includes a loading device 10, a printing device 20, a drying device 30, and an ejection device 40. In the printer 1, the printing device 20 applies a liquid to a sheet P carried from the loading device 10, thereby performing printing, and the drying device 30 dries the liquid adhering to the sheet P, after which the sheet P is ejected to the ejection device 40.

The loading device 10 includes a loading tray 11 on which a plurality of sheets P are stacked, a feeder 12 to separate and feed the sheets P one by one from the loading tray 11, and a registration roller pair 13 to feed the sheets P to the printing device 20. Any feeder such as a device using a roller or a device using air suction may be used as the feeder 12. The sheet P fed from the loading tray 11 by the feeder 12 is delivered to the printing device 20 by the registration roller pair 13 being driven at a predetermined timing after a leading end of the sheet P reaches the registration roller pair 13.

The printing device 20 includes a sheet conveyor 21 to convey the sheet P. The sheet conveyor 21 includes a sheet suction device 50 (see FIG. 3) including a drum 51, a suction unit 52, and the like. The drum 51 serves as a sheet bearer that bears the sheet P on a circumferential surface thereof and rotates. The suction unit 52 generates a suction force on the circumferential surface of the drum 51. The printing device 20 further includes a liquid discharge section 22 that discharges a liquid toward the sheet P borne on the drum 51 of the sheet conveyor 21.

The printing device 20 further includes a transfer cylinder 24 that receives the sheet P delivered from the loading device 10 and transfers the sheet P to the drum 51 and a transfer cylinder 25 that transfers the sheet P conveyed by the drum 51 to the drying device 30. The transfer cylinder 24 includes a sheet gripper to grip a leading end of the sheet P conveyed from the loading device 10 to the printing device 20. The sheet P thus gripped is conveyed as the transfer cylinder 24 rotates. The transfer cylinder 24 forwards the sheet P to the drum 51 at a position opposite the drum 51.

Similarly, the drum 51 includes a sheet gripper 106 (see FIG. 4) on the surface thereof, and the leading end of the sheet P is gripped by the sheet gripper 106 of the drum 51. The drum 51 includes a plurality of suction holes 112 (see FIGS. 3 and 4) dispersed on the surface thereof. The suction unit 52 generates a suction airflow through the plurality of suction holes 112 of the drum 51 toward an interior of the drum 51. On the drum 51, the sheet gripper 106 grips the leading end of the sheet P transferred from the transfer cylinder 24, and the sheet P is attracted to the drum 51 by the suction airflow by the suction unit 52. As the drum 51 rotates, the sheet P is conveyed.

The liquid discharge section 22 includes discharge units 23 (23A to 23F). For example, the discharge unit 23A discharges a liquid of cyan (C), the discharge unit 23B discharges a liquid of magenta (M), the discharge unit 23C discharges a liquid of yellow (Y), and the discharge unit 23D discharges a liquid of black (K). Further, the discharge units 23E and 23F are used to discharge the liquid of any one of Y, M, C, and K or a liquid of spot color such as white, gold, or silver. Furthermore, a discharge unit that discharges a treatment liquid such as a surface coating liquid may be provided.

The discharge unit 23 (each of the discharge units 23A to 23F) is a full line head type and includes a plurality of liquid discharge heads 125 arranged on a base 127. The liquid discharge head 125 includes nozzle rows 126 including a plurality of nozzles. The plurality of liquid discharge heads 125 is arranged, for example, as illustrated in FIG. 2. The discharge operation of the respective discharge units 23 of the liquid discharge section 22 is controlled by a drive signal corresponding to print data. When the sheet P carried by the drum 51 passes through a region facing the liquid discharge section 22, the respective color liquids are discharged from the discharge units 23, and an image corresponding to the print data is printed on the sheet P.

The drying device 30 includes a dryer 31 to dry the liquid adhering to the sheet P in the printing device 20 and a suction conveyor 32 to convey the sheet P conveyed from the printing device 20 while sucking the sheet P (i.e., suction conveyance). The sheet P conveyed from the printing device 20 is received by the suction conveyor 32, conveyed while passing through the dryer 31, and forwarded to the ejection device 40. When the sheet P passes through the dryer 31, the liquid on the sheet P is dried. Thus, a liquid component such as moisture in the liquid evaporates, and the colorant contained in the liquid is fixed on the sheet P. Additionally, curling of the sheet P is restrained.

The ejection device 40 includes an ejection tray 41 on which a plurality of sheets P is stacked. The plurality of sheets P conveyed from the drying device 30 is sequentially stacked and held on the ejection tray 41.

The printer 1 can further include, for example, a pretreatment device disposed upstream from the printing device 20, or a post-processing device (a finisher) disposed between the drying device 30 and the ejection device 40. The pretreatment device performs pretreatment on the sheet P. The post-processing device performs post-processing of the sheet P to which the liquid adheres.

For example, the pretreatment device coats the sheet P with a treatment liquid that reacts with the liquid to inhibit bleeding (a pre-coating process). For example, the post-processing device turns upside down the sheet P printed by the printing device 20 and again sends the sheet P to the printing device 20 for performing printing on both sides of the sheet P (a sheet reversal conveyance process). Alternatively, the post-processing device can bind together the plurality of sheets P.

Note that, in the present embodiment, the printing device 20 includes the liquid discharge section 22 including the discharge units 23 serving as an image forming unit to form an image on the sheet P. However, a printing device (image forming unit) employing other printing methods can be used instead of the discharge units 23.

Figure 3:
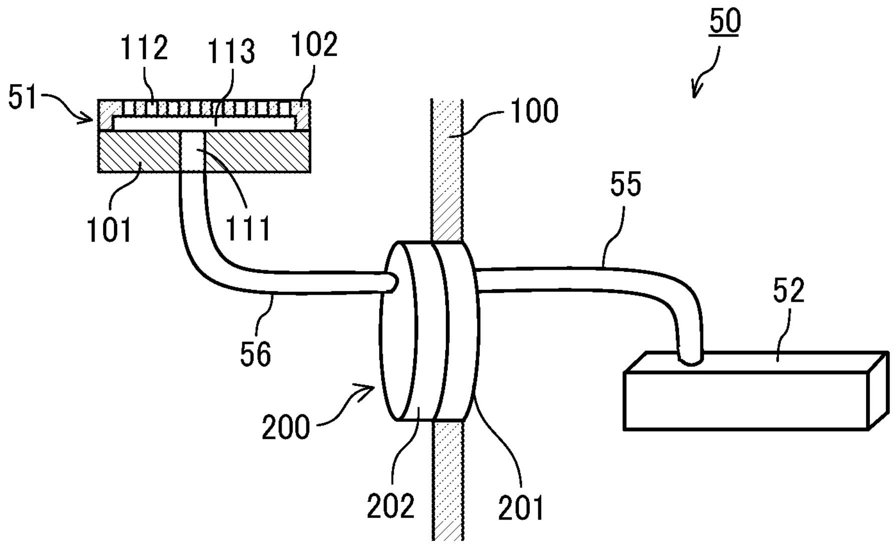
FIG. 3 is a schematic view illustrating a configuration of a sheet suction device according to the first embodiment of the present disclosure.

A sheet suction device 50 according to the first embodiment of the present disclosure is described with reference to FIG. 3. FIG. 3 is a schematic view illustrating a configuration of the sheet suction device 50. The sheet suction device 50 includes the drum 51 as a sheet bearer, the suction unit 52, and a rotary valve 200 as a suction area switching device disposed between the drum 51 and the suction unit 52. The suction unit 52 and the rotary valve 200 are communicated with each other via a hose (tube) 55, and the rotary valve 200 and the drum 51 are communicated with each other via a hose (tube) 56.

Figure 4:
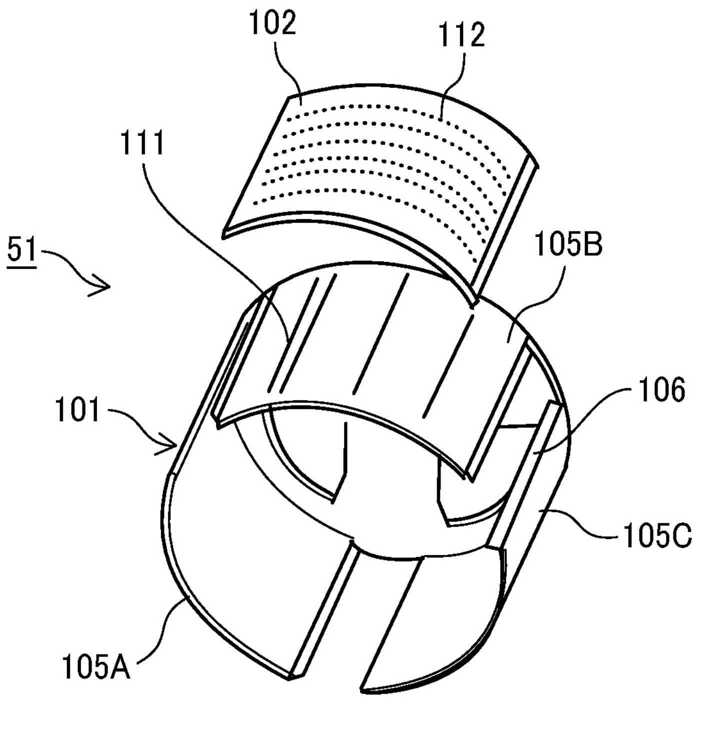
FIG. 4 is an exploded perspective view of a drum of the sheet suction device.
Figure 5:
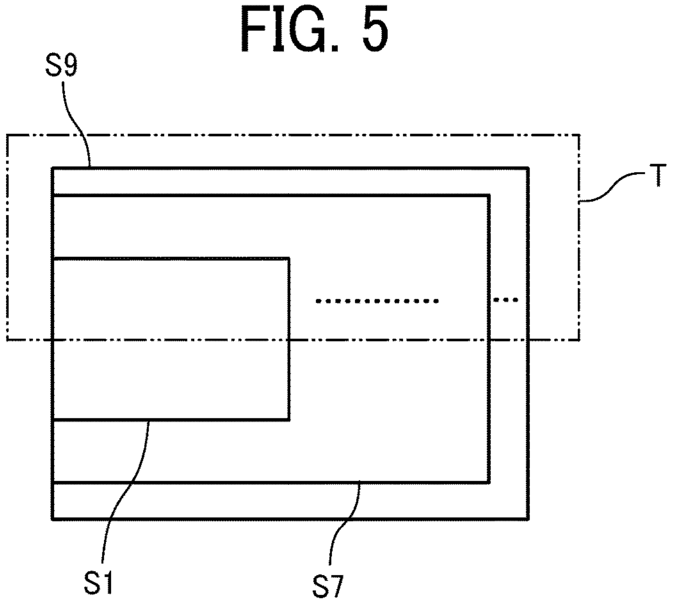
FIG. 5 is a plan view of sheet areas for explaining sheet sizes on one of bearing areas of the drum.
Figure 6:
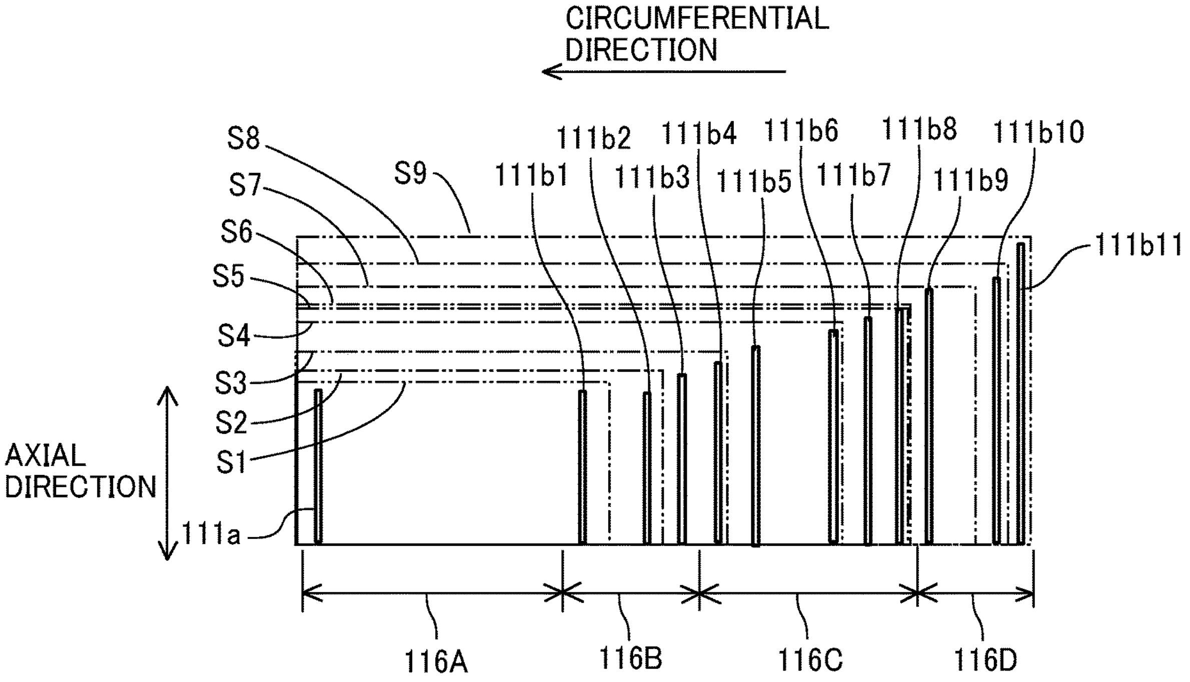
FIG. 6 is an enlarged plan view of a portion T in FIG. 5 for explaining the arrangement of suction ports of the drum and the sheet sizes in the circumferential direction of the drum.
Figure 7:
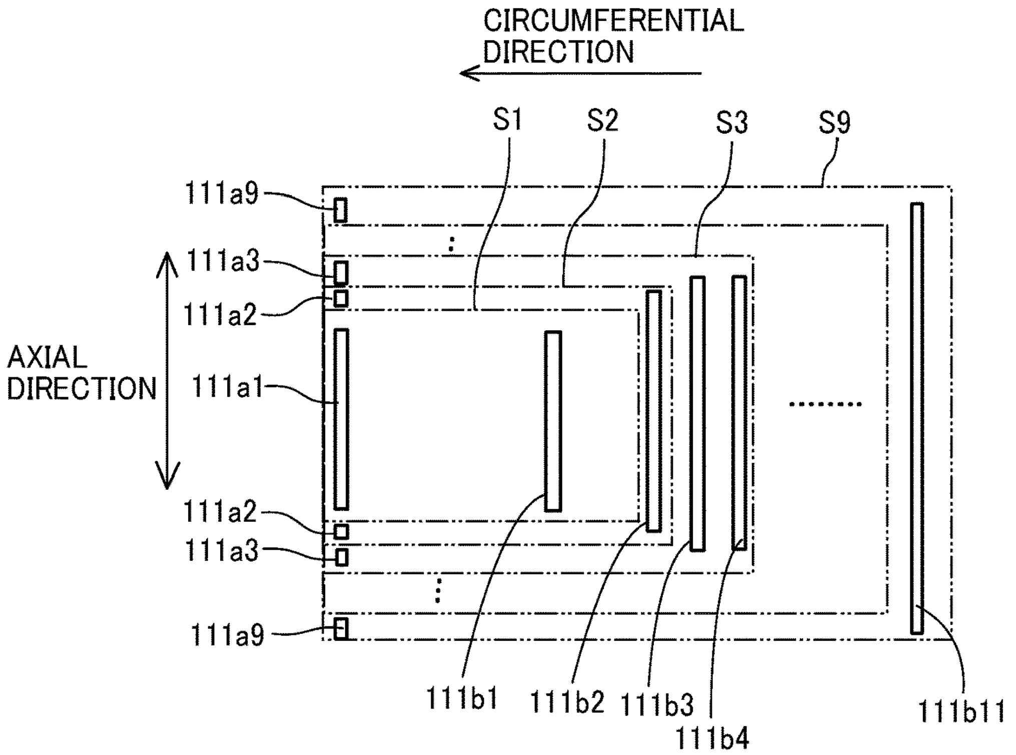
FIG. 7 is a plan view of the bearing area for explaining the arrangement of the suction ports and the sheet size in the axial and circumferential directions of the drum.
Figure 8:
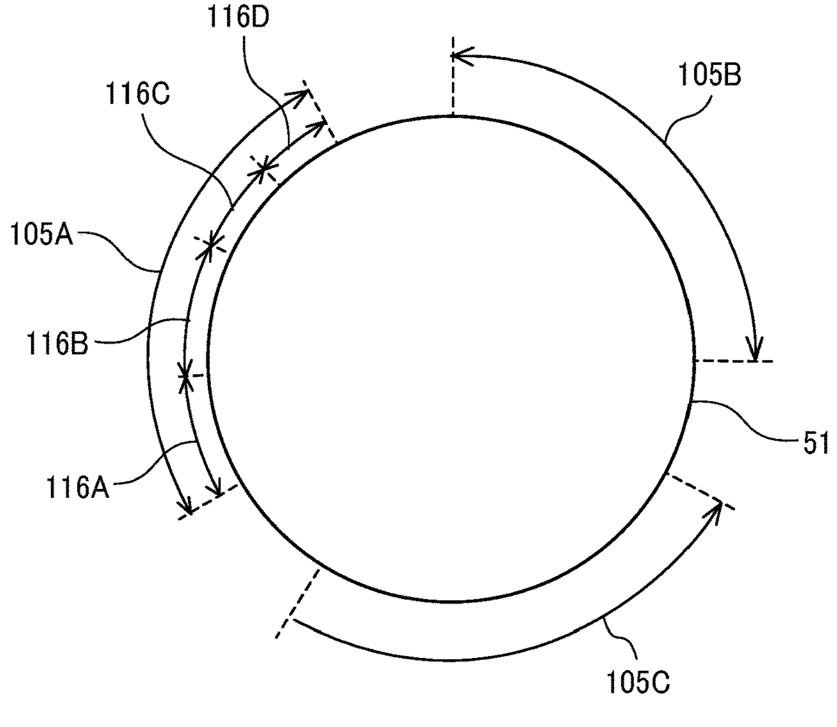
FIG. 8 is a schematic side view of the drum for explaining the bearing areas and divided areas thereof.

Next, the drum 51 is described with reference to FIGS. 4 to 7. FIG. 4 is an exploded perspective view of the drum 51. FIG. 5 is a plan view of sheet areas for explaining sheet sizes on one of bearing areas of the drum 51. FIG. 6 is an enlarged view of a portion T in FIG. 5 for explaining the arrangement of suction ports of the drum 51 and the sheet sizes in the circumferential direction of the drum 51. FIG. 7 is a plan view of the bearing area for explaining the arrangement of the suction ports and the sheet sizes in the axial and circumferential directions of the drum 51. FIG. 8 is a schematic side view of the drum 51 for explaining the bearing areas and divided areas thereof.

The drum 51 includes a drum body 101 and a suction plate 102. A sealing material such as a rubber sheet may be interposed between the suction plate 102 and the drum body 101. The drum 51 has three bearing areas 105 (105A to 105C) and can bear a plurality of sheets P in the circumferential direction thereof. As illustrated in FIG. 3, each bearing area 105 is constructed of the suction plate 102 and the drum body 101. The suction plate 102 includes the plurality of suction holes 112 and forms a chamber 113 with which each suction hole 112 communicates. The plurality of suction holes 112 is arranged in the axial and circumferential directions of the drum 51. The drum body 101 includes grooved suction ports 111 communicating with the chamber 113. The sheet gripper 106, which is simply illustrated in FIG. 4, is disposed at the leading end of the bearing area 105 in the direction of rotation of the drum 51 (hereinafter, referred to as a "rotation direction").

As illustrated in FIGS. 5 and 6, sheet areas S1 to S9 corresponding to a plurality of sheet sizes (9 sheet sizes in the present embodiment) are allocated to one bearing area 105, and 12 suction ports 111*a* (111*a*1 to 111*a*9) and 111*b*1 to 111*b*11 are arranged in the circumferential direction in the one bearing area 105. On the leading side of the bearing area 105 in the rotation direction, as illustrated in FIG. 7, the suction ports 111*a*1 to 111*a*9 are arranged in the axial direction corresponding to the sheet areas S1 to S9.

For example, the suction ports 111*a*1 and 111*b*1 are provided so as to communicate with a portion of the chamber 113 where the plurality of suction holes 112 corresponding to the sheet area S1 faces. The suction ports 111*a*2 and 111*b*2 are provided so as to communicate with a portion of the chamber 113 where the plurality of suction holes 112 corresponding to the sheet area S2 excluding the sheet area S1 faces. The suction ports 111*a*3, 111*b*3, and 111*b*4 are provided so as to communicate with a portion of the chamber 113 where the plurality of suction holes 112 corresponding to the sheet area S3 excluding the sheet areas S1 and S2 faces. The same applies to the other sheet areas S4 to S9.

Further, as illustrated in FIG. 8, one bearing area 105 is divided into a first range 116A, a second range 116B, a third range 116C, and a fourth range 116D from the leading side of the bearing area 105 in the circumferential direction (rotation direction). Here, as illustrated in FIG. 6, the first range 116A is allocated to the suction ports 111*a* on the leading side of the bearing area 105 in the rotation direction of the drum 51, the second range 116B is allocated to the suction ports 111*b*1 to 111*b*3, the third range 116C is allocated to the suction ports 111*b*4 to 111*b*8, and the fourth range 116D is allocated to the suction ports 111*b*9 to 111*b*11. Therefore, the suction area can be switched by connecting the hoses 56 to the respective suction ports 111 (suction ports 111*a* and 111*b*) on the drum 51 and switching whether to generate negative pressure for the respective suction ports 111 (suction ports 111*a* and 111*b*).

With reference again to FIG. 3, the rotary valve 200 includes a rotational portion 202 that rotates together with the drum 51 and a stationary portion 201 that is connected to the suction unit 52 and does not rotate together with the drum 51. The communication and non-communication between the suction holes 112 and the suction unit 52 are switched by a relative phase difference between the rotational portion 202 and the stationary portion 201, thereby controlling the timing of generating the negative pressure on the circumferential surface of the drum 51. Generally, both the rotational portion 202 and the stationary portion 201 have a disk-shape, and the sliding surface of the rotational portion 202 is, for example, a metal plate coated with resin.

Figure 9:
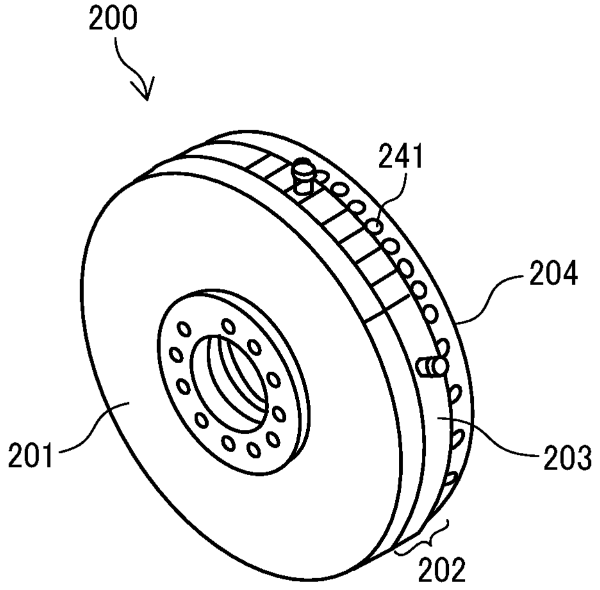
FIG. 9 is an exterior perspective view of a rotary valve according to the first embodiment of the present disclosure.
Figure 10:
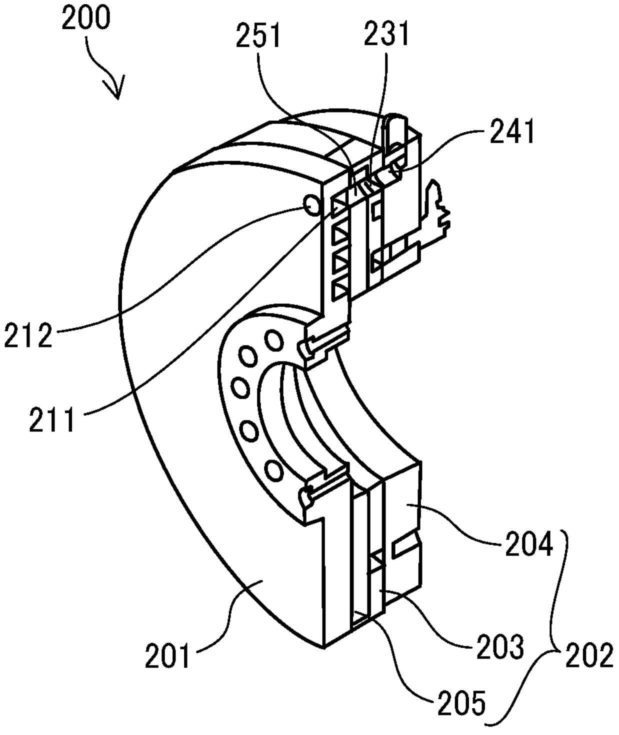
FIG. 10 is a cross-sectional perspective view of the rotary valve.
Figure 11:
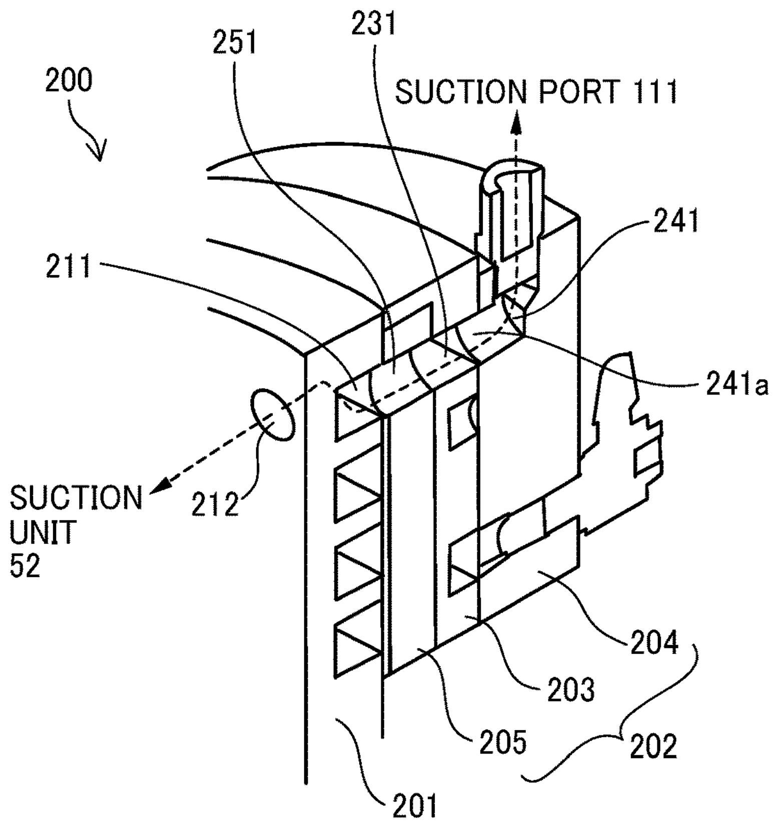
FIG. 11 is an enlarged cross-sectional perspective view of a part of the rotary valve.
Figure 12A:
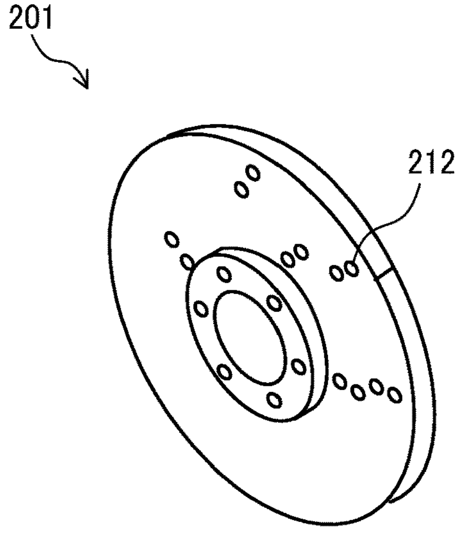
FIGS. 12A and 12B are perspective views of a stationary portion included in the rotary valve.
Figure 12B:
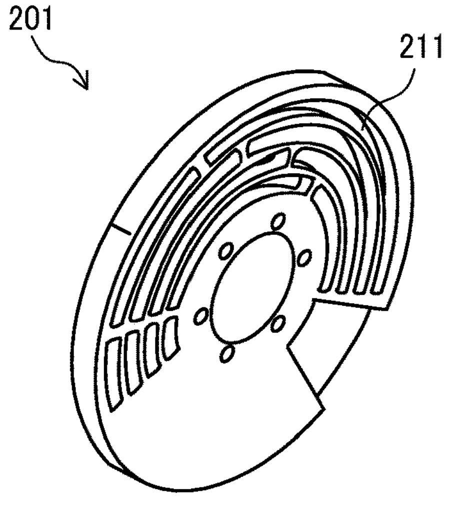
Figure 13:
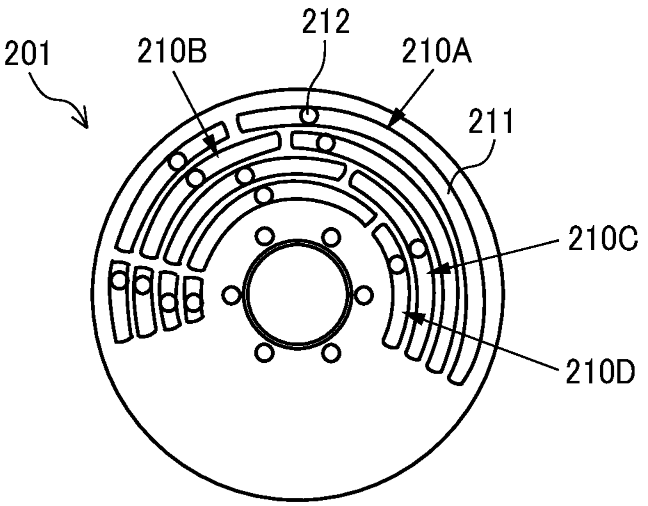
FIG. 13 is a side view of the stationary portion.
Figure 14A:
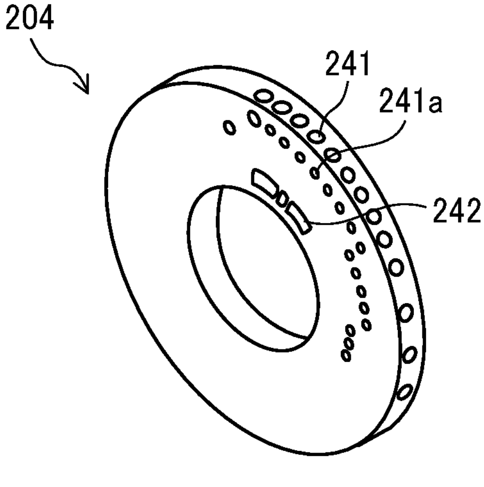
FIGS. 14A and 14B are perspective views of a second member included in the rotary valve.
Figure 14B:
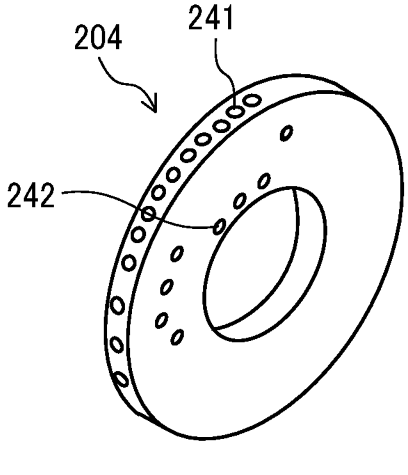
Figure 15:
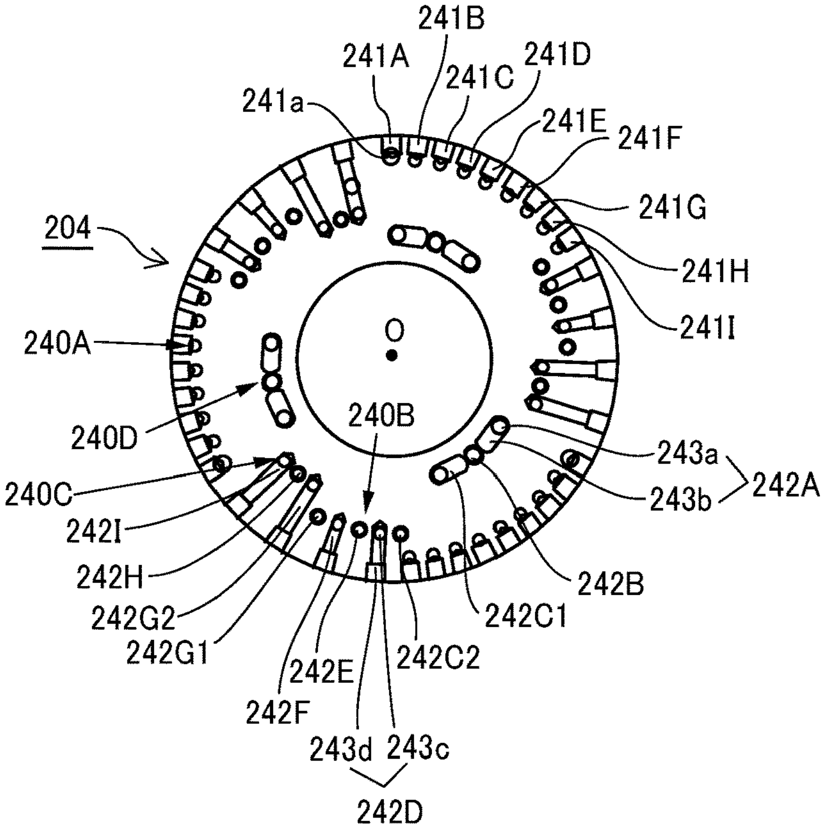
FIG. 15 is a side view of the second member.
Figure 16A:
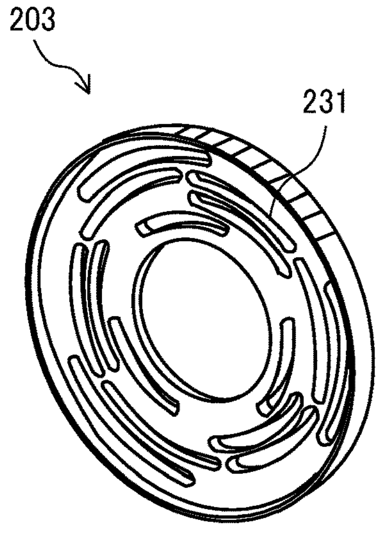
FIGS. 16A and 16B are perspective views of a first member included in the rotary valve.
Figure 16B:
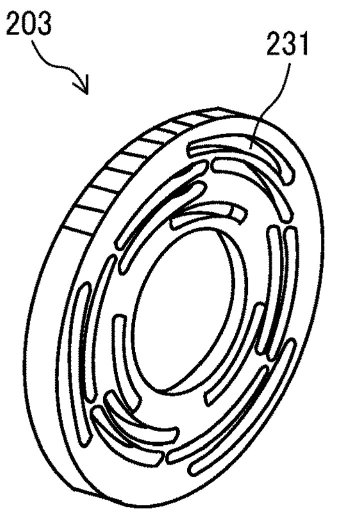
Figure 17:
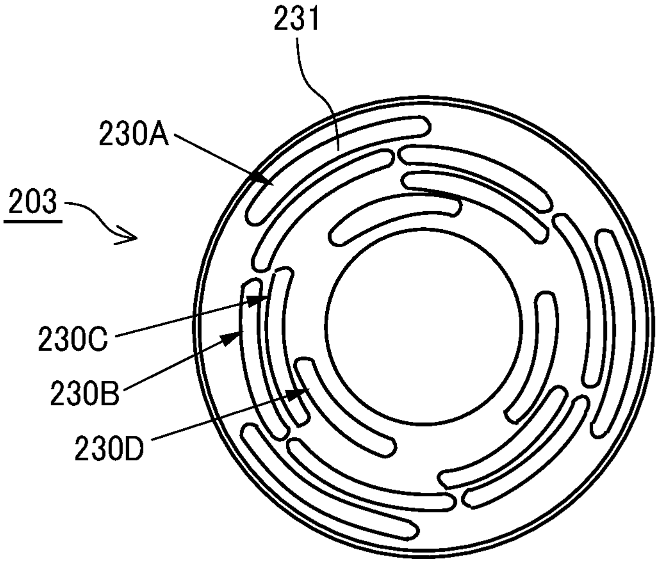
FIG. 17 is a side view of the first member.
Figure 18A:
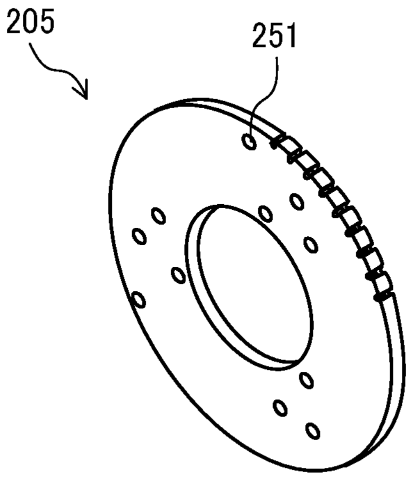
FIGS. 18A and 18B are perspective views of a third member included in the rotary valve.
Figure 18B:
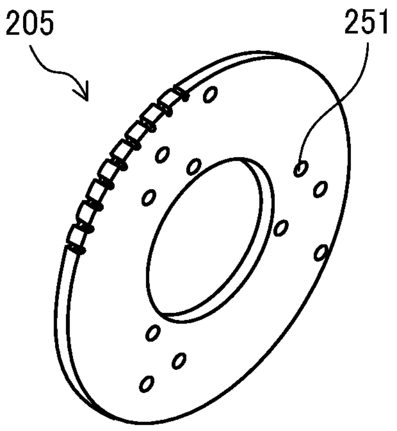
Figure 19:
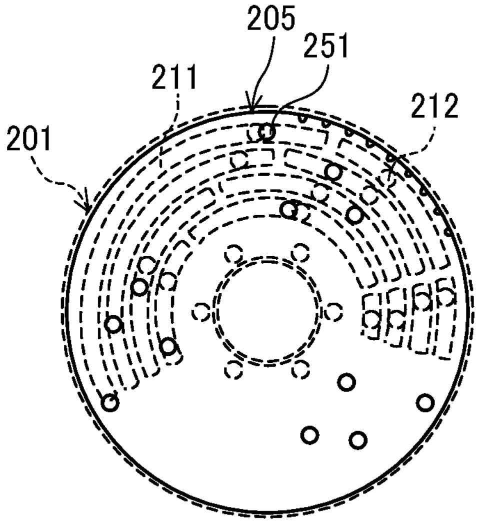
FIG. 19 is a side view of the third member overlaid on the stationary portion.

Next, the rotary valve 200 is described with reference to FIGS. 9 to 15. FIG. 9 is an exterior perspective view of the rotary valve 200. FIG. 10 is a cross-sectional perspective view of the rotary valve 200. FIG. 11 is an enlarged cross-sectional perspective view of a part of the rotary valve 200. FIGS. 12A and 12B are perspective views of the stationary portion 201 included in the rotary valve 200. FIG. 13 is a side view of the stationary portion 201. FIGS. 14A and 14B are perspective views of a second member 204 included in the rotary valve 200. FIG. 15 is a side view of the second member 204. FIGS. 16A and 16B are perspective views of a first member 203 included in the rotary valve 200. FIG. 17 is a side view of the first member 203. FIGS. 18A and 18B are perspective views of a third member 205 included in the rotary valve 200. FIG. 19 is a side view of the third member 205 overlaid on the stationary portion 201.

As illustrated in FIG. 3, the stationary portion 201 of the rotary valve 200 is secured to a frame 100 of the printer 1. The frame 100 supports the drum 51, the transfer cylinder 24, and the discharge units 23. As illustrated in FIGS. 12A and 12B, the stationary portion 201 has a plurality of rows of grooves 211 arranged in the radial direction and divided into three in the circumferential direction on the side surface that slides with the rotational portion 202. Each groove 211 has a through hole 212 connected to the suction unit 52. Here, the rows of the grooves 211 located on the same concentric circles are referred to as groove rows 210A, 210B, 210C, 210D, respectively as illustrated in FIG. 13.

As illustrated in FIGS. 10 and 11, the rotational portion 202 of the rotary valve 200 includes the first member 203, the second member 204, and the third member 205 that are arranged in the order of the third member 205, the first member 203, and the second member 204 from the stationary portion 201. In the radial direction, the first member 203 has a shape that covers the outer circumferential surface of the third member 205, and the third member 205 fits into the first member 203.

As illustrated in FIGS. 14A to 15, the second member 204 has a plurality of holes 241 communicating with the suction ports 111 of the drum 51 on the circumferential surface of the disk-shape (here, nine holes 241A to 241I), and each hole 241 has an opening 241*a* disposed on the side surface in contact with the first member 203. The nine holes 241A to 241I arranged in the circumferential direction communicate with the nine suction ports 111*a* (111*a*1 to 111*a*9) arranged in the axial direction of the drum 51 and can be connected to the corresponding portions of the plurality of suction holes 112.

Further, the second member 204 has a plurality of types of holes 242 (242A to 242I) on the side surface of the disk-shape. Each of the holes 242A and 242C1 is constructed of a through hole 243*a* that penetrates the second member 204 in the axial direction and a groove 243*b* extending in the circumferential direction. The through hole 243*a* communicates with the groove 243*b*. Each of the holes 242B, 242C2, 242E, 242G1, and 242H is constructed of a through hole 243*a* that penetrates the second member 204 in the axial direction. Each of the holes 242D, 242F, 242G2, and 242I is constructed of a non-through hole 243*c* that does not penetrate the second member 204 in the axial direction and a hole 243*d* that extends in the radial direction from the non-through hole 243*c*. These holes 242 also communicates with the suction ports 111. As illustrated in FIG. 15, the pluralities of holes 241 and 242 are provided corresponding to the respective bearing areas 105A, 105B, and 105C, but in FIGS. 14A and 14B, the illustration is simplified and the holes 241 and 242 in one bearing area 105 are depicted.

As illustrated in FIGS. 16A to 17, the first member 203 has through grooves 231 along the circumferential direction on the side surface of the disk-shape, corresponding to each bearing area 105. The grooves 231 are arranged at four locations on the concentric circles from the outer circumference toward the center in the radial direction, and the rows of the grooves 231 located on the same concentric circles are referred to as groove rows 230A, 230B, 230C, 230D, respectively as illustrated in FIG. 17.

With reference again to FIG. 15, the rows of the openings 241*a* and the holes 242 of the second member 204 corresponding to the groove rows 230A to 230D of the first member 203 are referred to as hole rows 240A to 240D from the outer circumference toward the center, respectively. In each row, the openings 241*a* and the holes 242 are arranged in the circumferential direction of the second member 204. In the second member 204, the hole 242C1 belonging to the hole row 240D and the hole 242C2 belonging to the hole row 240B are two or more holes 242 that simultaneously communicate with the suction unit 52 via the first member 203 by the rotation of a unit rotation amount of the first member 203.

Figure 30:
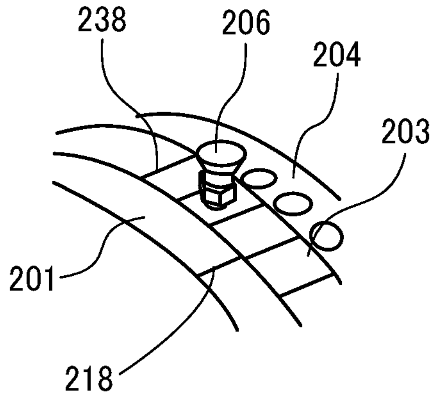
FIG. 30 is an enlarged perspective view of a part of the rotary valve.

Here, the "unit rotation amount" means the minimum unit of the amount of rotation to rotate the first member 203 with respect to the second member 204 when the number of suction holes 112 communicating with the suction unit 52 is changed (switched) by only one step. When the first member 203 is manually rotated, the unit rotation amount is the amount of rotation corresponds to one scale of a nine-step scale 238 illustrated in FIG. 30 described later. Further, in the present embodiment, the first member 203 can be automatically rotated by a drive source such as a motor. In this case, the motor is controlled so as to rotate the first member 203 by each unit rotation amount. The unit rotation amount is the amount of rotation to change the number of suction holes 112 by only one step. As illustrated in FIG. 30, the unit rotation amount is uniform in each of the nine steps in the present embodiment but may be different in each step.

The holes 242C1 and 242C2, which are the two or more holes 242 that simultaneously communicate with the suction unit 52, are disposed at different distances from a rotation center O of the first member 203. In other words, the two holes 242C1 and 242C2, which communicate at the same time, belong to the different hole rows 240D and 240B among the plurality of hole rows 240 arranged in the radial direction of the second member 204, respectively.

Similarly, in the second member 204, the hole 242G1 belonging to the hole row 240B and the hole 242G2 belonging to the hole row 240C are two or more holes 242 that simultaneously communicate with the suction unit 52 via the first member 203 by the rotation of the unit rotation amount of the first member 203. That is, the holes 242G1 and 242G2, which are the two or more holes 242 that simultaneously communicate with the suction unit 52, are disposed at different distances from the rotation center O of the first member 203. In other words, the two holes 242G1 and 242G2, which communicate at the same time, belong to the different hole rows 240B and 240C among the plurality of hole rows 240 arranged in the radial direction of the second member 204, respectively.

In this way, the two holes 242C1 and 242C2 or the two holes 242G1 and 242G2 that are simultaneously communicate by the rotation of the unit rotation amount are provided. One of the two holes is selected according to the size of the sheet P to be used, and the rest that is not selected is closed by a plug. This configuration facilitates the adaptation to the size of the sheet P according to a destination.

That is, in the present embodiment, the "destination" indicates a country or region where the sheet suction device 50 and the printer 1 including the sheet suction device 50 are used. For example, since the size (dimensions) of standard sheets frequently used for printing differs between Japan and Europe, the suction area preferably corresponds to a sheet size group frequently used in each country or region. Therefore, depending on the size of the sheet P used at the destination, one of the two holes 242 that simultaneously communicate with the suction unit 52 by the rotation of the unit rotation amount is selected, and the rest that is not selected is closed by the plug, thereby facilitating the adaptation to the size of the sheet P.

As illustrated in FIG. 19, the third member 205 has a through hole 251 that penetrates the disk-shape thereof and connects the groove 211 of the stationary portion 201 and the groove 231 of the first member 203. The first member 203, the second member 204, and the third member 205 included in the rotational portion 202 rotate together with the drum 51 when the sheet P is conveyed.

When the suction area is switched, the first member 203 is rotated relative to the second member 204 and the third member 205. The second member 204 and the third member 205 rotate together. As the first member 203 is rotated, the number of holes 242 of the second member 204 communicating with the grooves 231 of the first member 203 is changed, thereby changing the connection of the suction path. Accordingly, the suction area can be switched according to the size of the sheet P.

Figure 20:
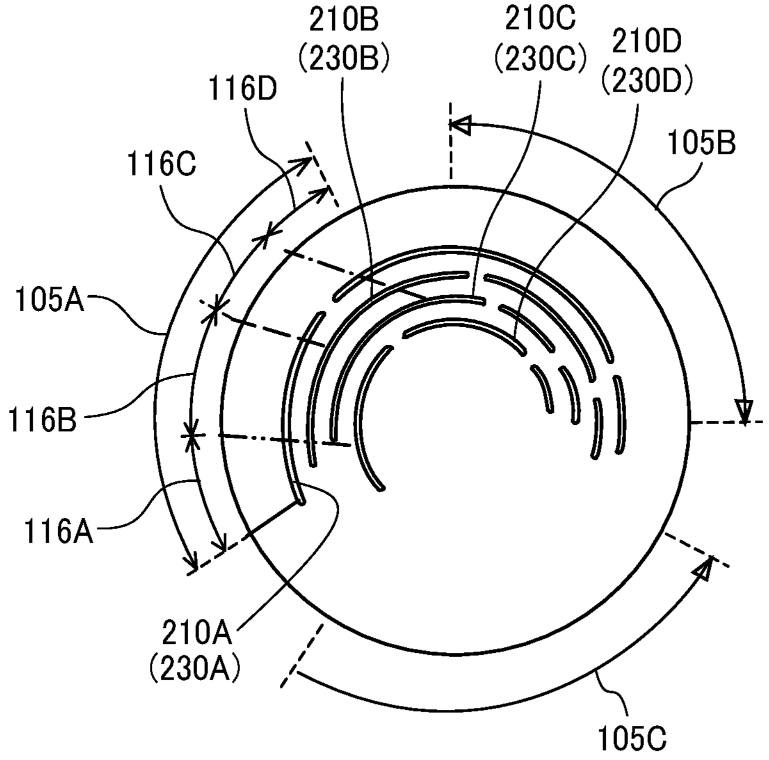
FIG. 20 is a schematic view for explaining allocation of grooves of the stationary portion to the bearing area.

The allocation of grooves 211 of the stationary portion 201 to the bearing areas 105 is described below with reference to FIG. 20. FIG. 20 is a schematic view for explaining the allocation. As described above, the circumferential surface of the drum 51 is divided into three bearing areas 105 (105A to 105C). One bearing area 105 is divided into the four ranges, i.e., the first range 116A, the second range 116B, the third range 116C, and the fourth range 116D.

The outermost groove row 210A of the stationary portion 201 is allocated to the first range 116A, and the groove row 230A of the first member 203 switches between communication and non-communication with the suction port 111 of the first range 116A. Further, the groove row 210D of the stationary portion 201 is allocated to the second range 116B, and the groove row 230D of the first member 203 switches between communication and non-communication with the suction port 111 of the second range 116B. Similarly, the groove row 210B of the stationary portion 201 is allocated to the third range 116C, and the groove row 230B of the first member 203 switches between communication and non-communication with the suction port 111 of the third range 116C. The groove row 210C of the stationary portion 201 is allocated to the fourth range 116D, and the groove row 230C of the first member 203 switches between communication and non-communication with the suction port 111 of the fourth range 116D.

Figure 21A:
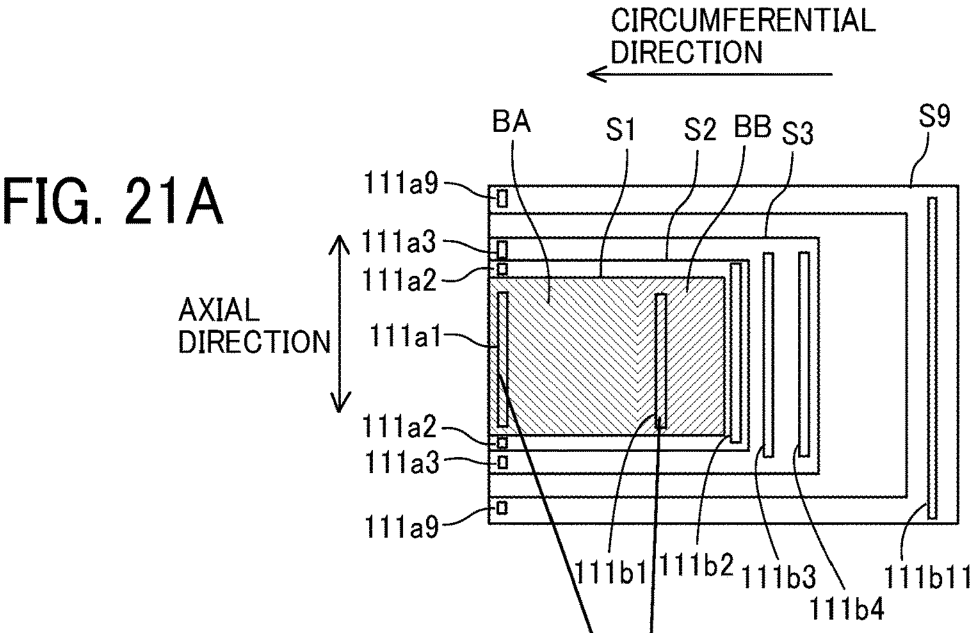
FIGS. 21A to 21C are schematic views for explaining switching of suction area (size switching) by relative rotation of the first member and the second member.
Figure 21B:
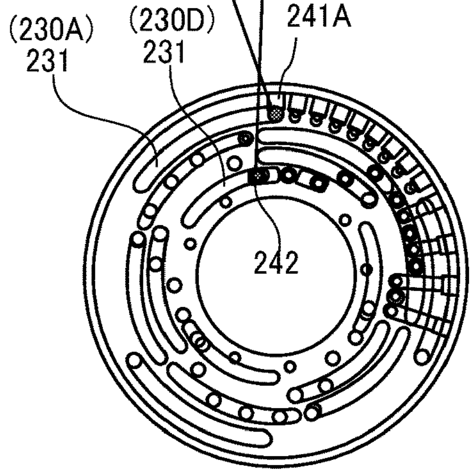
Figure 21C:
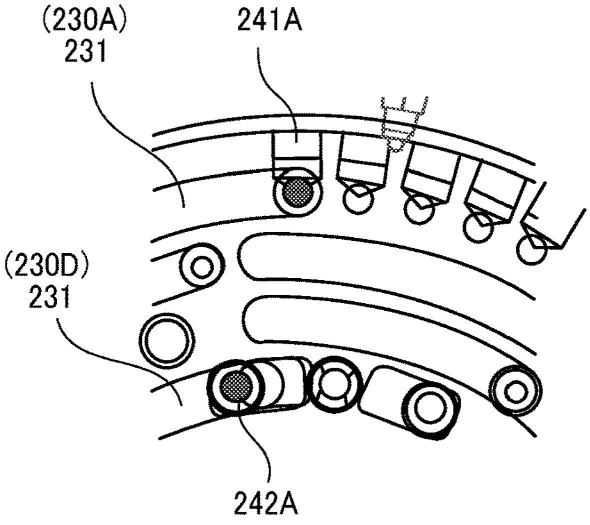
Figure 22A:
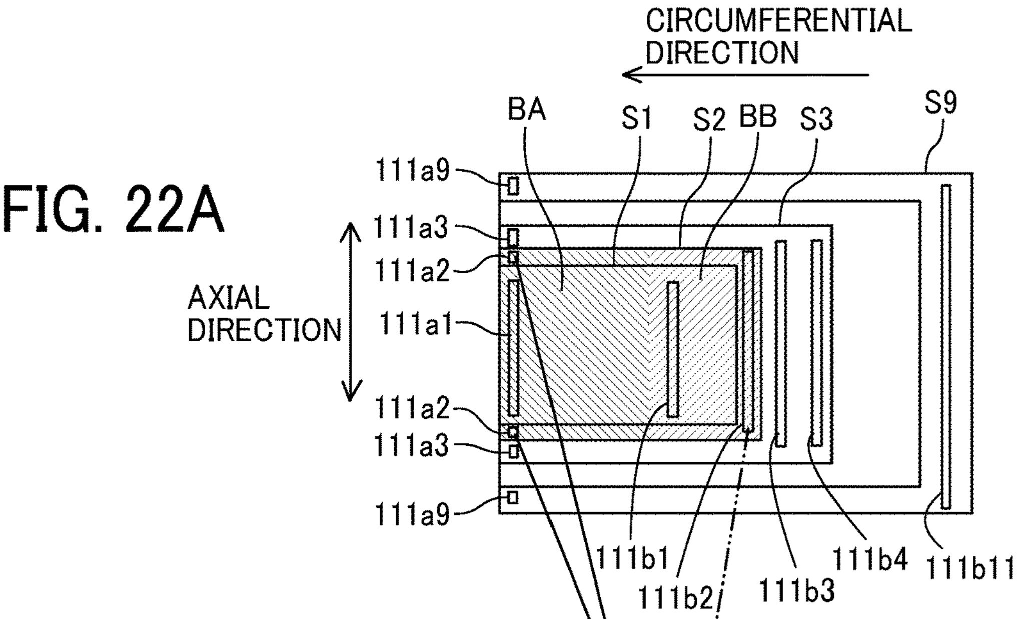
FIGS. 22A to 22C are schematic views for explaining the switching of suction area (size switching)
Figure 22B:
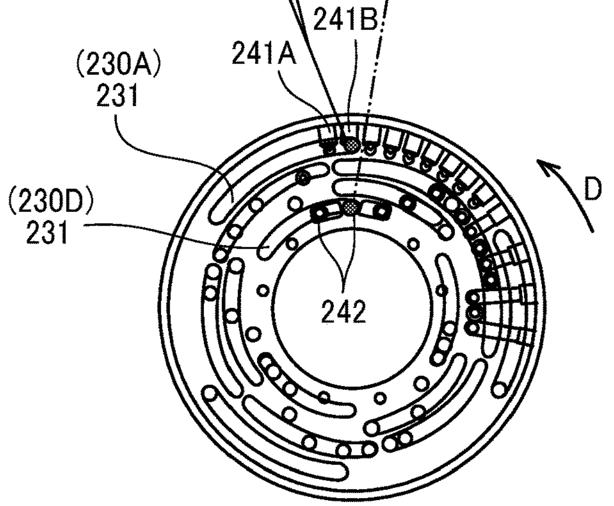
Figure 22C:
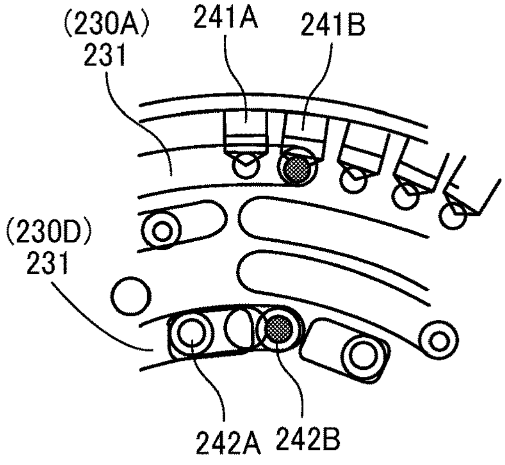
Figure 23C:
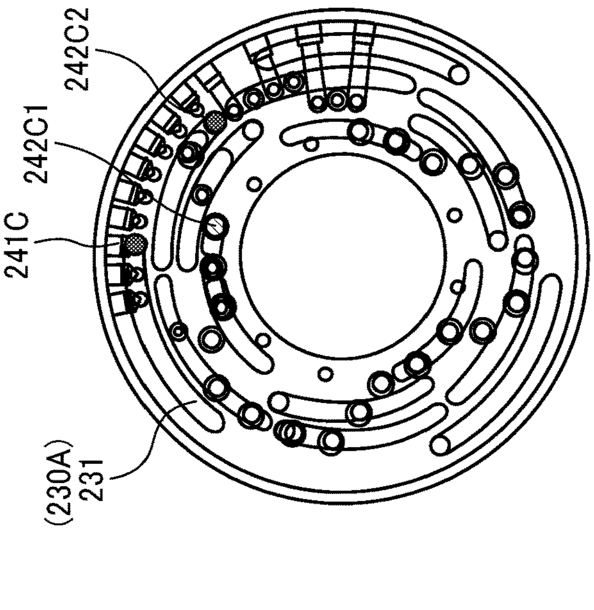
FIGS. 23A to 23C are transparent side views of the first member and the second member for explaining transition states when the suction area is switched in nine steps.
Figure 23B:
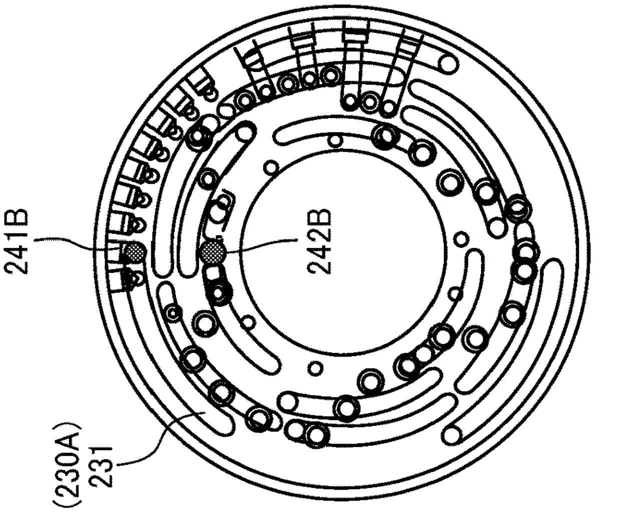
Figure 23A:
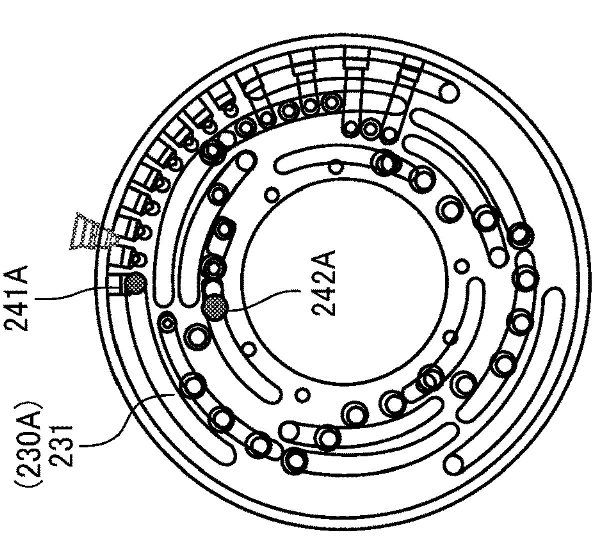
Figure 24A:
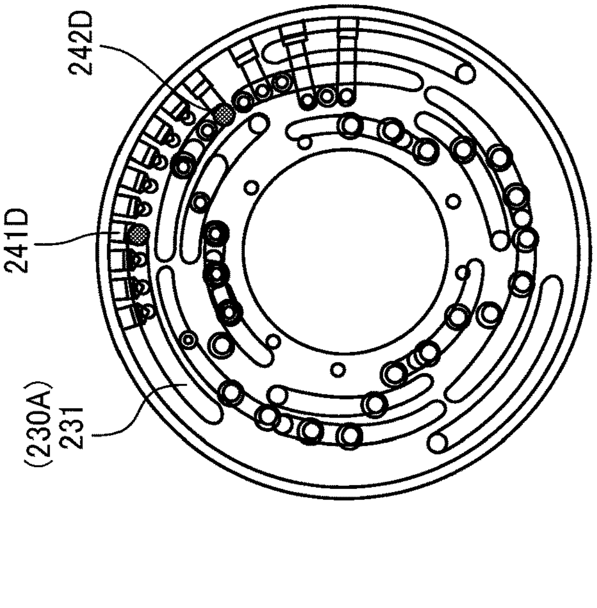
FIGS. 24A to 24C are transparent side views of the first member and the second member for explaining the next transition states following the transition state in FIG. 23C.
Figure 24B:
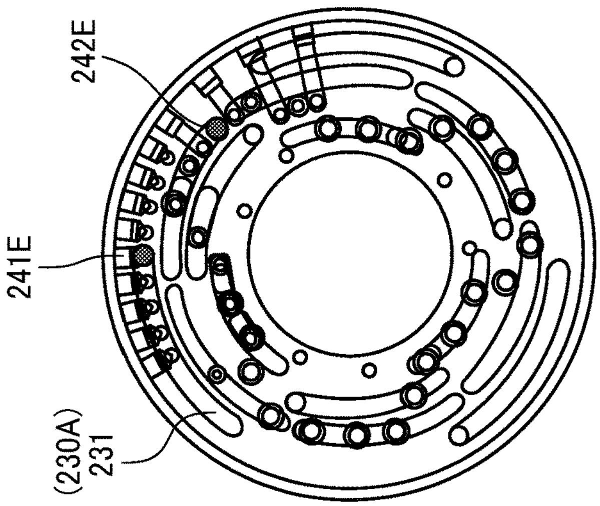
Figure 24C:
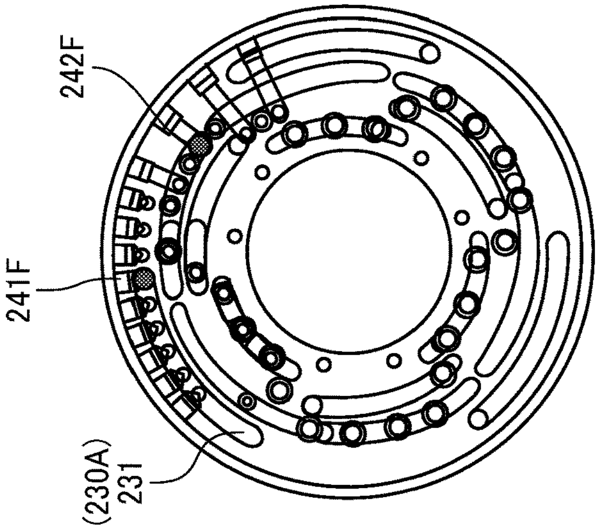
Figure 25C:
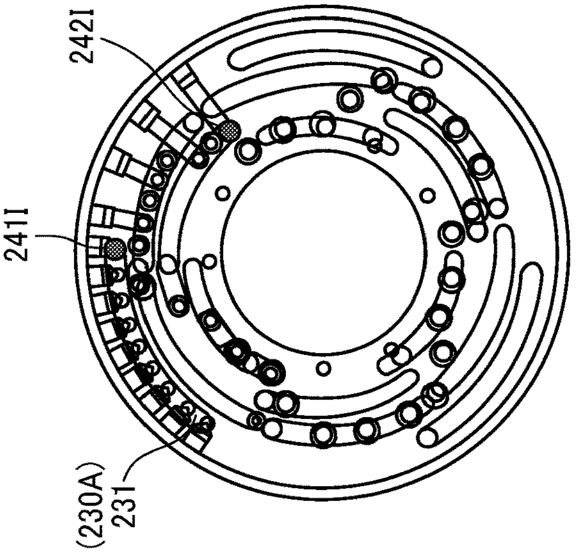
FIGS. 25A to 25C are transparent side views of the first member and the second member for explaining the next transition states following the transition state in FIG. 24C.
Figure 25B:
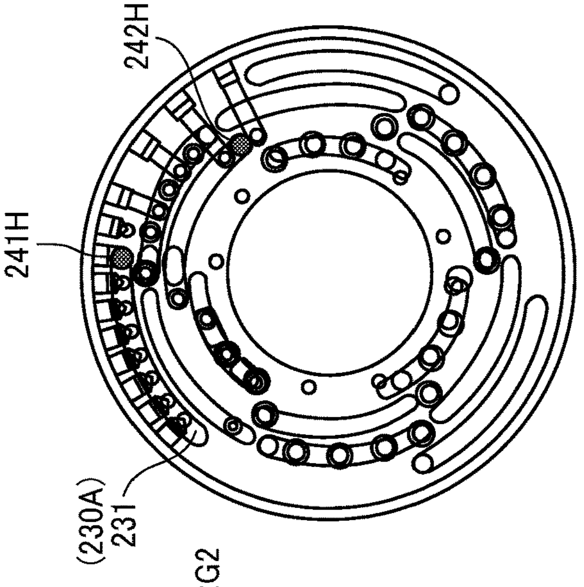
Figure 25A:
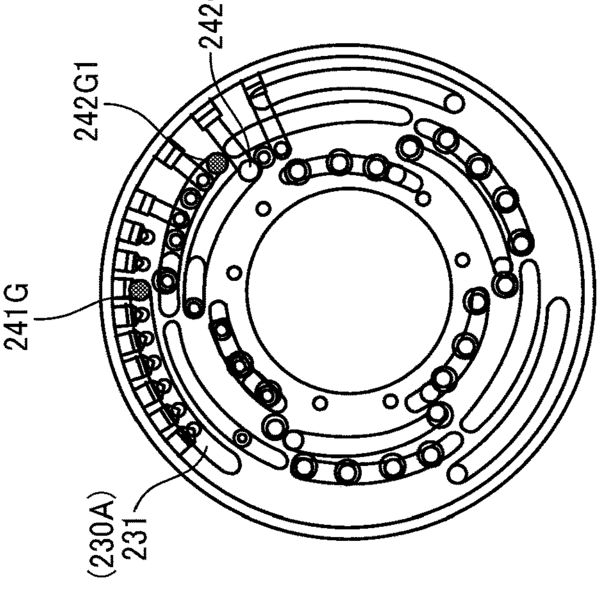

Next, the switching of the suction area (size switching) by the relative rotation of the first member 203 and the second member 204 is described with reference to FIGS. 21A to 22C. FIGS. 21A to 22C are schematic views for explaining the switching of the suction area. FIGS. 21A and 22A are top views illustrating the size of the sheet P and the suction ports 111 on the drum 51. FIGS. 21B and 22B are side views illustrating the first member 203 and the second member 204 transparently. FIGS. 21C and 22C are enlarged views of the first member 203 and the second member 204 illustrated in FIGS. 21B and 22B.

As described above, the nine holes 241A to 241I provided in the circumferential direction of the second member 204 communicate with the nine suction ports 111*a* (111*a*1 to 111*a*9). Therefore, the number of the suction ports 11*a* (111*a*1 to 111*a*9) communicating with the groove 231 of the groove row 230A of the first member 203 via the holes 241 (the openings 241*a*) of the second member 204 is switched, thereby switching the size of the suction area in the axial direction perpendicular to the circumferential direction of the drum 51. That is, the number of the holes 241 (the openings 241*a*) of the second member 204 communicating with the grooves 231 of the first member 203 is switched, thereby switching the number of the suction holes 112 communicating with the suction unit 52. These suction holes 112 face the corresponding portions of the chamber 113 with which the suction ports 111*a* communicate.

Further, the holes 242A to 242I of the second member 204 communicate with the suction ports 111*b* (111*b*1 to 111*b*11) of the drum 51. Therefore, the number of the suction ports 111*b* (111*b*1 to 111*b*11) communicating with the grooves 231 of the groove rows 230B to 230D of the first member 203 via the holes 242 of the second member 204 is switched, thereby switching the size of the suction area in the circumferential direction of the drum 51.

That is, the number of the holes 242 of the second member 204 communicating with the grooves 231 of the first member 203 is switched, thereby switching the number of the suction holes 112 communicating with the suction unit 52. These suction holes 112 face the corresponding portions of the chamber 113 with which the suction ports 11*b* communicate.

For example, as illustrated in FIGS. 21B and 21C, the relative position between the first member 203 and the second member 204 is set to a state in which the groove 231 of the groove row 230A of the first member 203 communicates with the hole 241A of the second member 204 and the groove 231 of the groove row 230D of the first member 203 communicates with the hole 242A of the second member 204. At this time, the suction unit 52 and the suction port 111*a*1 of the drum 51 communicate with each other, and the suction unit 52 and the suction port 111*b*1 of the drum 51 communicate with each other. As a result, as illustrated in FIG. 21A, the suction unit 52 sucks the sheet P through the suction holes 112 belonging to an area BA communicating with the suction port 111*a*1 and an area BB communicating with the suction port 111*b*1, thereby sucking the sheet P in the suction area for the sheet area S1.

From this state, for example, as illustrated in FIGS. 22B and 22C, the first member 203 is rotated with respect to the second member 204 in the direction indicated by arrow D, and the relative position between the first member 203 and the second member 204 is set to a state in which the groove 231 of the groove row 230A of the first member 203 communicates with the two holes 241A and 241B of the second member 204 and the groove 231 of the groove row 230D of the first member 203 communicates with the two holes 242A and 242B of the second member 204. Note that the circles shaded in black in FIGS. 22B and 22C indicate the newly communicated holes (i.e. the hole 241B and 242B). At this time, the suction unit 52 and the suction ports 111*a*1 and 111*a*2 of the drum 51 communicate with each other, and the suction unit 52 and the suction ports 111*b*1 and 111*b*2 of the drum 51 communicate with each other. As a result, as illustrated in FIG. 22A, the suction unit 52 sucks the sheet P through the suction holes 112 belonging to the area BA communicating with the suction ports 111*a*1 and 111*a*2, and the area BB communicating with the suction ports 111*b*1 and 111*b*2, thereby sucking the sheet P in the suction area for the sheet area S2 having the next size of the sheet area S1.

With the above configuration, the transition when the first member 203 is rotated to switch the relative position with the second member 204 in nine steps is illustrated in FIGS. 23A to 25C. FIGS. 23A to 25C are transparent side views of the first member 203 and the second member 204. Note that the relative position is the same in FIG. 23A and FIG. 21B, and the relative position is the same in FIG. 23B and FIG. 22B.

The holes 241 and 242 of the second member 204 are arranged so that two or three holes among the holes 241 and 242 additionally communicate with the grooves 231 of the first member 203 in one of the bearing areas 105 of the drum 51 each time the relative position is switched by one step. In the present embodiment, since the drum 51 has the three bearing areas 105, six or nine holes among the holes 241 and 242 additionally communicate with the grooves 231 of the first member 203 when the first member 203 is rotated by one step.

The number of holes that additionally communicates by one step is two or three so that the hole communicating with the groove can be selected according to the destination. For example, three suction ports 111*b* are allocated to the innermost groove row 230D and five suction ports 111*b* are allocated to the groove row 230C, or two suction ports 111*b* are allocated to the innermost groove row 230D and five suction ports 111*b* are allocated to the groove row 230C.

Figure 26:
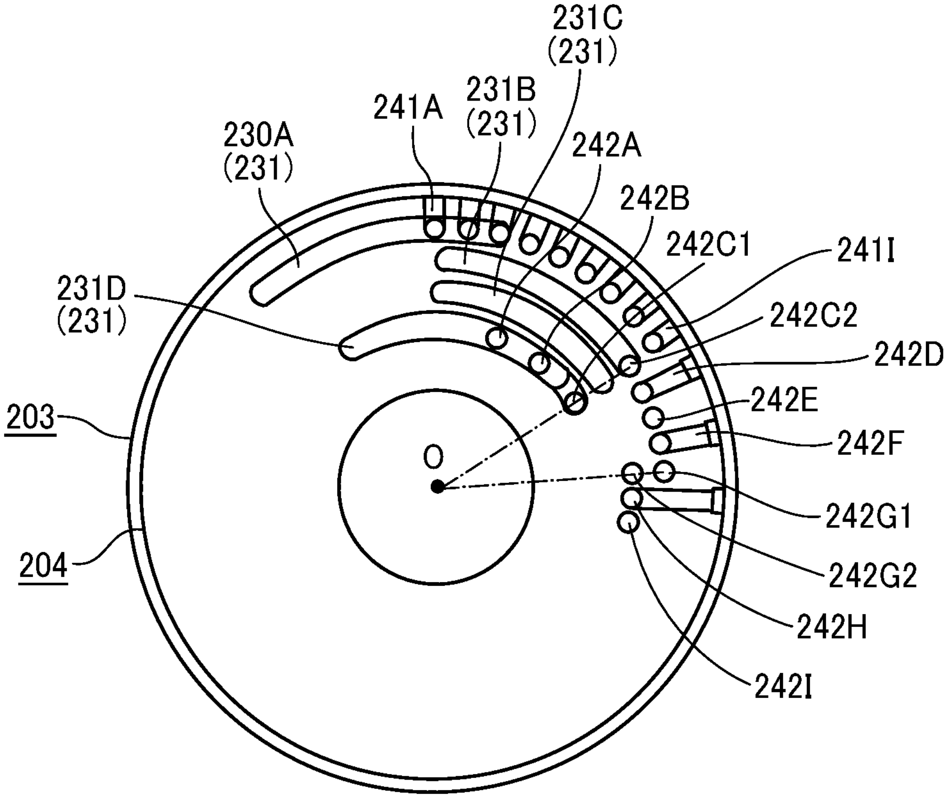
FIG. 26 is a schematic view of the first member overlaid on the second member of the rotary valve according to a second embodiment of the present disclosure.

Next, a second embodiment of the present disclosure is described with reference to FIG. 26. FIG. 26 is a schematic view of the first member 203 overlaid on the second member 204 of the rotary valve 200 according to the second embodiment. In the second embodiment, holes 242C1 and 242C2 are arranged in a row with respect to the rotation center O of the first member 203 in the radial direction. Similarly to the holes 242C1 and 242C2 in the first embodiment, one of the holes 242C1 and 242C2 is selected, for example, according to the destination. Similarly, holes 242G1 and 242G2 in the second embodiment are also arranged in a row with respect to the rotation center O of the first member 203 in the radial direction.

As a result, in the second embodiment, the distance between the holes 242C1 and 242C2 or the distance between the holes 242G1 and 242G2 becomes shorter than that in the first embodiment. The distance between the holes 242C1 and 242C2 or the distance between the holes 242G1 and 242G2 is shortest when the two holes 242 are arranged on a straight line in the radial direction. With this configuration, the workability of changing the holes 242 to be used is improved because the distance between the two holes 242, which are selectively used, is short.

That is, since the hoses 56 are connected to the respective holes 242 of the second member 204 via connectors, the connectors and the hoses 56 are densely packed. Among the holes 242 that can be selected according to the destination, the hoses 56 are connected to the holes 242 to be used via the connectors, and the plug for maintaining airtightness fits into the unused holes 242.

After the shipment of the device, the destination may be switched to change the usage (reuse), and the groove 231 to be used may be changed for a customized suction plate 102 on the surface of the drum 51. In this case, since the connector to be replaced and the plug are close to each other, the number of parts to be replaced and the time required for replacement and confirmation are reduced to modify the device. Accordingly, the workability of modifying the device is improved.

In the present embodiment, both the holes 242G1 and 242G2 are through holes. With this configuration, the central axes of the holes 242G1 and 242G2 that simultaneously communicate with the grooves 231 are substantially parallel to each other. That is, the directions to attach the connector and the hose 56 are the same, thereby facilitating the modification work.

Figure 27:
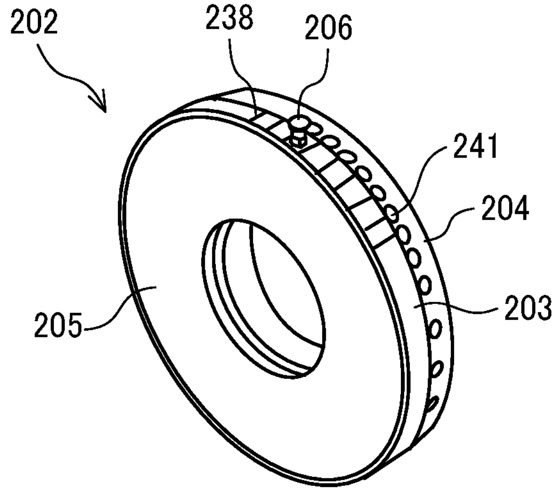
FIG. 27 is a perspective view of a rotational portion of the rotary valve for explaining switching operation by the first member.
Figure 28:
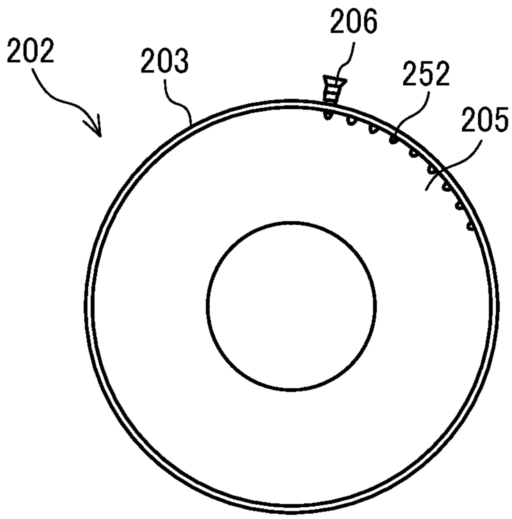
FIG. 28 is a side view of the rotational portion.
Figure 29:
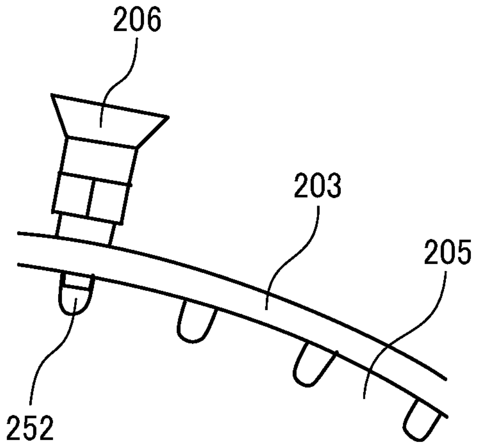
FIG. 29 is an enlarged side view of a part of the rotational portion.

Next, the switching operation by the first member 203 is described with reference to FIGS. 27 to 30. FIG. 27 is a perspective view of the rotational portion 202 of the rotary valve 200. FIG. 28 is a side view of the rotational portion 202. FIG. 29 is an enlarged side view of a part of the rotational portion 202. FIG. 30 is an enlarged perspective view of a part of the rotary valve 200. In the present embodiment, the first member 203 can be manually rotated by a user. The user manually rotates the first member 203 to switch the suction area. The rotation operation of the first member 203 (i.e., suction area switching operation) uses an index plunger 206. The tip of the index plunger 206 fits into a hole 252 formed on the circumferential surface of the third member 205 according to each position, thereby positioning the first member 203. When performing the rotation operation of the first member 203, the user pulls out the index plunger 206 from the hole 252 and rotates the first member 203 relative to the second member 204 and the third member 205 to the target position. At the target position, the user inserts the tip of the index plunger 206 into another hole 252.

In order to recognize the setting state of the first member 203, for example, the nine-step scale 238 is attached to the circumferential surface of the first member 203 to indicate the rotation position of the first member 203. Further, as illustrated in FIG. 30, a mark 218 as a reference for the scale 238 of the first member 203 can be provided on the circumferential surface of the stationary portion 201. As described above, one scale of a nine-step scale 238 corresponds to the unit rotation amount. The unit rotation amount is the amount of rotation to change the number of suction holes 112 by only one step. As illustrated in FIG. 30, the unit rotation amount is uniform in each of the nine steps in the present embodiment but may be different in each step. When the size of the sheet P is switched, for example, in a sheet size switching mode, the drum 51 is set at a predetermined phase so that the user can access the index plunger 206. Further, the drum 51 is secured at the predetermined position so that the drum 51 is not rotated when the user operates the index plunger 206.

Figure 31:
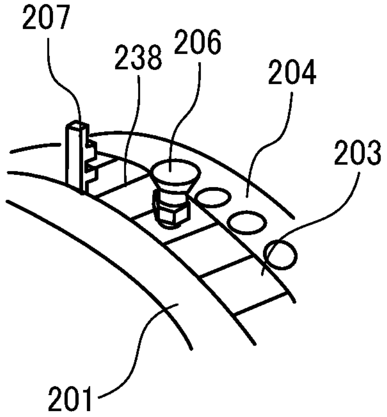
FIG. 31 is an enlarged perspective view of a part of the rotary valve for explaining acquisition of size data in the suction area.

Next, a description is given of data acquisition of the size of the suction area with reference to FIG. 31. FIG. 31 is a perspective view of a part of the rotary valve 200 for explaining the data acquisition. A photo sensor 207 is attached to the stationary portion 201 that does not rotate together with the drum 51, and the first member 203 is provided with a detection piece (feeler) detected by the photo sensor 207. With this configuration, since the first member 203 rotates together with the drum 51, the photo sensor 207 detects the feeler and generates one pulse each time the drum 51 makes one rotation. When the same mechanism is provided on the drum 51, a total of two pulses are detected during one rotation of the drum 51, one by the feeler provided on the drum 51 and one by the feeler provided on the first member 203.

Since the first member 203 has a phase difference with the second member 204 that rotates together with the drum 51, the rotation angle of the first member 203 can be detected by measuring the interval between the two pulses generated by the drum 51 and the first member 203 rotating at a constant speed. As a result, the relative phase difference between the first member 203 and the second member 204, that is, the setting data of the suction area can be acquired.

Figure 32:
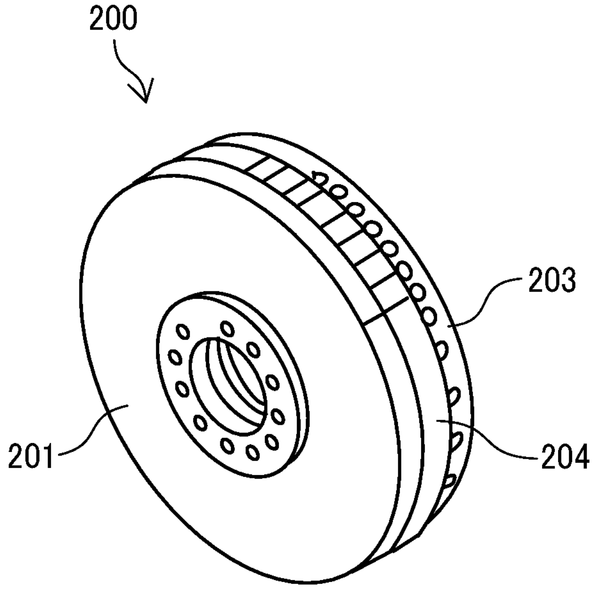
FIG. 32 is an exterior perspective view of the rotary valve according to a third embodiment of the present disclosure.
Figure 33:
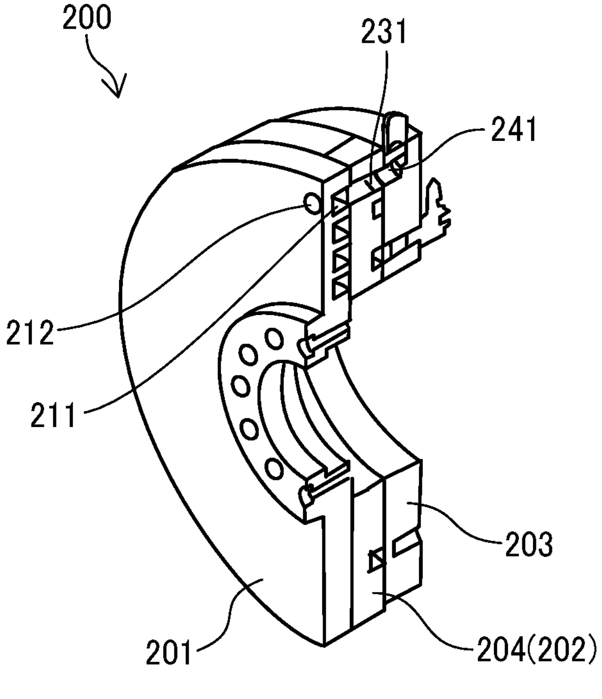
FIG. 33 is a cross-sectional perspective view of the rotary valve according to the third embodiment.
Figure 34:
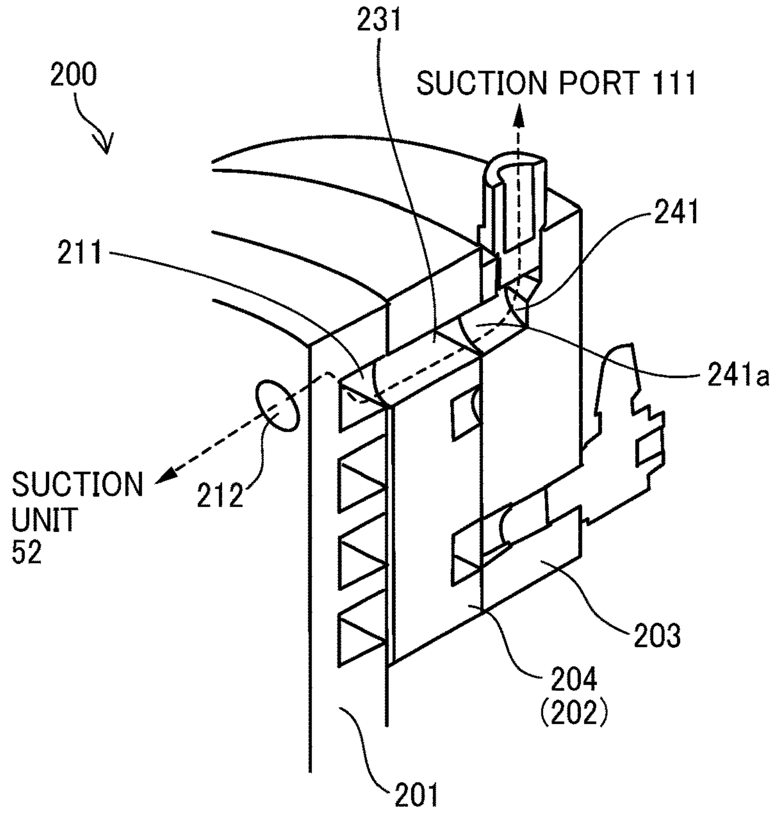
FIG. 34 is an enlarged cross-sectional perspective view of a part of the rotary valve according to the third embodiment.
Figure 35A:
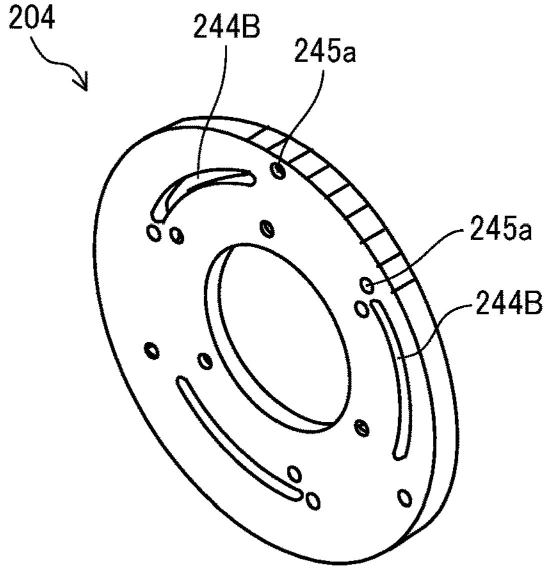
FIGS. 35A and 35B are perspective views of the second member included in the rotary valve according to the third embodiment.
Figure 35B:
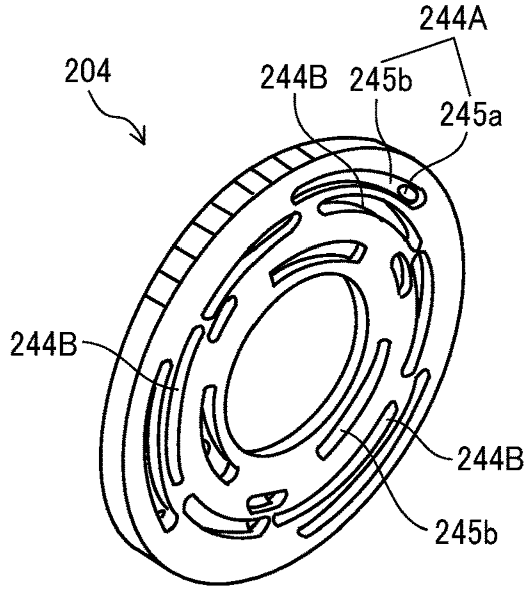
Figure 36:
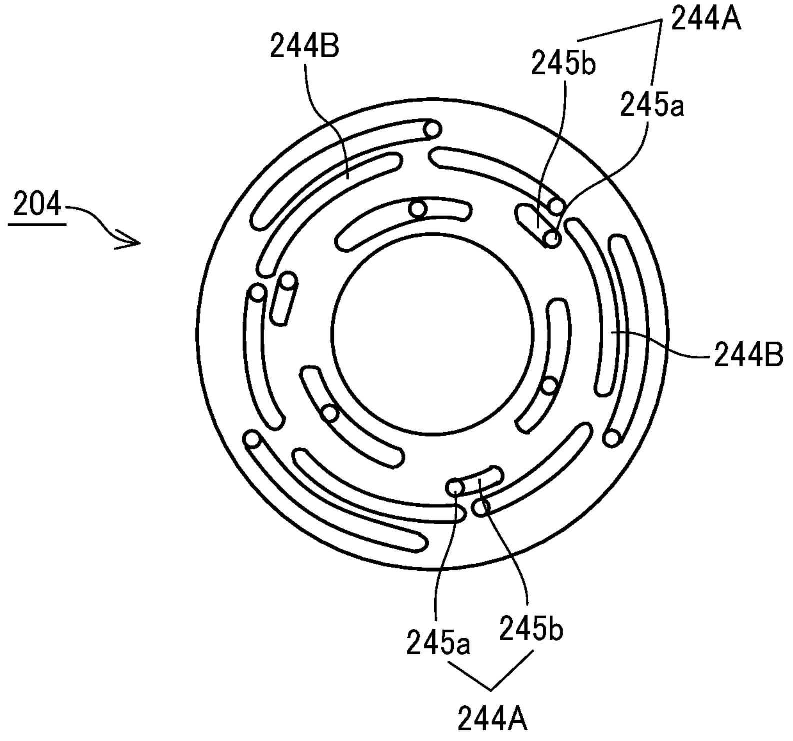
FIG. 36 is a side view of the second member according to the third embodiment.

Next, a third embodiment of the present disclosure is described with reference to FIGS. 32 to 36. FIG. 32 is an exterior perspective view of the rotary valve 200. FIG. 33 is a cross-sectional perspective view of the rotary valve 200. FIG. 34 is an enlarged cross-sectional perspective view of a part of the rotary valve 200. FIGS. 35A and 35B are perspective view of the second member 204 included in the rotary valve 200. FIG. 36 is a side view of the second member 204. The second member 204 in the third embodiment is the member that combines the first member 203 and the third member 205 in the first embodiment, and the first member 203 in the third embodiment is the second member 204 in the first embodiment.

In the second member 204, a hole 244A, a groove 244B, and the like are arranged on the side surface of the disk-shape corresponding to each bearing area 105. The holes 244A has a through hole 245*a* penetrating the second member 204 in the axial direction and a groove 245*b* extending in the circumferential direction. The through hole 245*a* communicates with the groove 245*b*. The groove 244B extending in the circumferential direction penetrates the second member 204 in the axial direction. The hole 244A, the groove 244B, and the like are arranged at four locations on the concentric circles from the outer circumference toward the center in the radial direction.

Therefore, also in the present embodiment, the size of the suction area (the number of suction holes 112 communicating with the suction unit 52) is switched by rotating the first member 203 relative to the second member 204. In this case, the second member 204 rotates together with the drum 51. As the first member 203 rotates, the distance between the suction port 111 of the drum 51 and the connection port of the hose 56 of the rotational portion 202 of the rotary valve 200 changes. Therefore, the hoses 56 are arranged so as to be adaptable to the change of the distance.

In the above embodiments, the circumferential direction of the drum 51 is the same as the circumferential direction of the first member 203 and the circumferential direction of the second member 204, and the same applies to the axial direction and the radial direction.

As described above, according to the present disclosure, the suction area can be changed with a simple configuration.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A sheet suction device comprising:

a sheet bearer to bear a sheet on a bearing area of a circumferential surface of the sheet bearer and rotate, the sheet bearer having a plurality of suction holes on the bearing area;

a suction generator to suck the sheet through the plurality of suction holes, the suction generator connecting to the plurality of suction holes via a tube;

a first structure between the plurality of suction holes and the suction generator, the first structure having grooves arranged in a radial direction of the first structure, each of the grooves extending in a circumferential direction of the first structure; and a second structure between the plurality of suction holes and the suction generator, the second structure having a plurality of hole rows including a plurality of holes, the plurality of holes in each of the plurality of hole rows arranged in the circumferential direction, the plurality of hole rows arranged in the radial direction, wherein, when the first structure rotates with respect to the second structure, the number of holes communicating with the grooves among the plurality of holes is changed to change the number of the plurality of suction holes communicating with the suction generator, and wherein the plurality of holes includes two or more holes that simultaneously communicate with the suction generator when the first structure rotates by a unit rotation amount.

2. The sheet suction device according to claim 1, wherein the two or more holes have central axes that are parallel to each other.

3. The sheet suction device according to claim 1, wherein the two or more holes are arranged in a row with respect to a rotation center of the first structure in the radial direction.

4. The sheet suction device according to claim 1, wherein the two or more holes are arranged at different distances from a rotation center of the first structure.

5. The sheet suction device according to claim 1, wherein the two or more holes belong to different hole rows of the plurality of hole rows.

6. The sheet suction device according to claim 1, wherein the sheet bearer is configured to bear a plurality of sheets in a circumferential direction of the sheet bearer.

7. The sheet suction device according to claim 1, wherein the first structure and the second structure are configured to rotate together with the sheet bearer.

8. The sheet suction device according to claim 1, wherein the first structure is rotatable manually.

9. The sheet suction device according to claim 1, wherein the plurality of suction holes is arranged in a circumferential direction of the sheet bearer, and wherein, when the first structure rotates, the number of the plurality of suction holes communicating with the suction generator is changed in the circumferential direction.

10. The sheet suction device according to claim 1, wherein the plurality of suction holes is arranged in an axial direction of the sheet bearer, and wherein, when the first structure rotates, the number of the plurality of suction holes communicating with the suction generator is changed in the axial direction.

11. A sheet conveyor comprising the sheet suction device according to claim 1, wherein the sheet bearer is configured to rotate to convey the sheet.

12. A printer comprising:

the sheet conveyor according to claim 11; and an image former to form an image on the sheet.

13. A sheet suction device comprising:

a sheet bearer to bear a sheet on a bearing area of a circumferential surface of the sheet bearer and rotate, the sheet bearer having a plurality of suction holes on the bearing area;

a suction generator to suck the sheet through the plurality of suction holes, the suction generator connecting to the plurality of suction holes via a tube;

a first structure between the plurality of suction holes and the suction generator, the first structure having a plurality of hole rows including a plurality of holes, the plurality of holes in each of the plurality of hole rows arranged in a circumferential direction of the first structure, the plurality hole rows arranged in a radial direction of the first structure; and a second structure between the plurality of suction holes and the suction generator, the second structure having grooves arranged in the radial direction, each of the grooves extending in the circumferential direction, wherein, when the first structure rotates with respect to the second structure, the number of holes communicating with the grooves among the plurality of holes is changed to change the number of the plurality of suction holes communicating with the suction generator, and wherein the plurality of holes includes two or more holes that simultaneously communicate with the suction generator when the first structure rotates by a unit rotation amount.

14. The sheet suction device according to claim 13, wherein the second structure is configured to rotate together with the sheet bearer.

15. A suction area switching device between a plurality of suction holes on a bearing area of a circumferential surface of a sheet bearer to bear a sheet and a suction generator to suck the sheet through the plurality of suction holes, the suction generator connecting to the plurality of suction holes via a tube, the suction area switching device comprising:

a first structure having grooves arranged in a radial direction of the first structure, each of the grooves extending in a circumferential direction of the first structure; and a second structure having a plurality of hole rows including a plurality of holes, the plurality of holes in each of the plurality of hole rows arranged in the circumferential direction, the plurality hole rows arranged in the radial direction, wherein, when the first structure rotates with respect to the second structure, the number of holes communicating with the grooves among the plurality of holes is changed to change the number of the plurality of suction holes communicating with the suction generator, and wherein the plurality of holes includes two or more holes that simultaneously communicate with the suction generator when the first structure rotates by a unit rotation amount.

* * * * *